United States Patent
Takabatake et al.

(10) Patent No.: US 6,320,909 B1
(45) Date of Patent: Nov. 20, 2001

(54) PICTURE DECODING AND DISPLAY UNIT INCLUDING A MEMORY HAVING REDUCE STORAGE CAPACITY FOR STORING PIXEL DATA

(75) Inventors: Akihiko Takabatake; Shinichi Uramoto, both of Hyogo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/567,010

(22) Filed: May 9, 2000

Related U.S. Application Data

(62) Division of application No. 08/908,599, filed on Aug. 8, 1997, which is a continuation of application No. 08/594,195, filed on Jan. 31, 1996, now abandoned.

(30) Foreign Application Priority Data

May 9, 1995 (JP) .................................................. 7-110512

(51) Int. Cl.[7] .................................................. H04N 7/12
(52) U.S. Cl. ...................................................... 375/240.25
(58) Field of Search .................... 375/240.25, 240.01, 375/240.15, 240.26; H04N 7/12

(56) References Cited

U.S. PATENT DOCUMENTS

| | | |
|---|---|---|
| 5,321,508 | 6/1994 | Veltman et al. . |
| 5,398,072 | 3/1995 | Auld . |
| 5,461,420 | 10/1995 | Yonemitsu et al. . |
| 5,461,421 | 10/1995 | Moon . |
| 5,467,136 | 11/1995 | Odaka et al. . |
| 5,537,215 | 7/1996 | Niimura et al. . |

OTHER PUBLICATIONS

Nikkei Electronics, Mar. 14, 1994, pp. 82–116.
"MPEG/H.261 Video Decoder", SGS–Thomson Microelectronics, Jul. 1992, p. 16.
"Proceedings of the 1995 IEICE General Conference", Mar. 10, 1995, pages 4, 179.

*Primary Examiner*—Young Lee
(74) *Attorney, Agent, or Firm*—McDermott, Will & Emery

(57) ABSTRACT

A memory having a storage capacity of storing pixel data of one frame is employed as a bank for display of bidirectional predictive encoded pixel data, and time difference between a timing for starting decoding of a given frame in a decoding unit and that for starting display of pixel data of the given frame in a display unit is set at one field time. The storage capacity of a memory device employed for display of pixel data is reduced in a picture decoding and display unit having a decoding and display function.

12 Claims, 27 Drawing Sheets

DISPLAY ORDER OF RESPECTIVE FRAMES

TIME

DECODING ORDER OF RESPECTIVE FRAMES (ORDER IN ENCODED DATA)

HEAD OF DATA

F I G. 7A
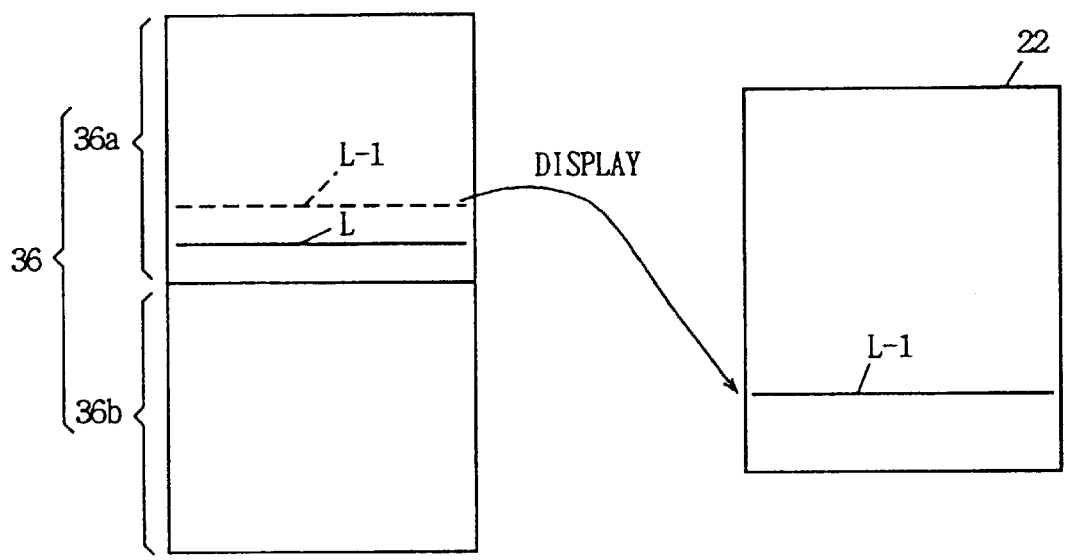
F I G. 7B
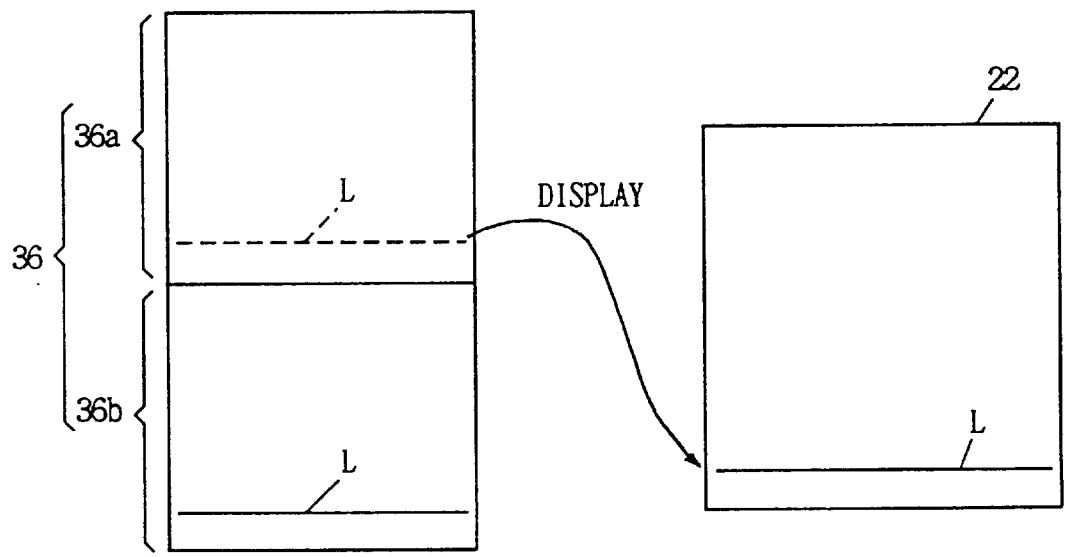

○ :ODD FIELD PIXEL

□ :EVEN FIELD PIXEL

NON-INTERLACE DISPLAY

INTERLACE DISPLAY

PICTURE DECODING AND DISPLAY UNIT INCLUDING A MEMORY HAVING REDUCE STORAGE CAPACITY FOR STORING PIXEL DATA

This application is a Divisional of Application Ser. No. 08/908,599 filed Aug. 8, 1997, which is a Continuation of Application Ser. No. 08/594,195 filed Jan. 31, 1996 and now abandoned.

BACKGROUND OF THE INVENTION

1. Field of the Invention

The present invention relates to a picture decoding/display unit which decodes encoded picture data and outputs decoded pixel data for display on a display unit, and more particularly, it relates to a picture decoding and display unit which decodes predictively encoded moving picture data and outputs the decoded data for display. More specifically, the present invention relates to a structure for reducing the storage capacity of a storage element storing B pictures in decoding along the MPEG (moving picture experts group) standard.

2. Description of the Background Art

In transmission of an enormous quantity of picture data, the data quantity is reduced by decoding the picture data in high efficiency. Techniques of such high efficiency encoding include an inter-frame (or inter-field) predictive encoding system. This inter-frame (or inter-field) predictive encoding, which utilizes temporal correlation between pictures, is generally employed for encoding moving picture data.

The inter-frame (or inter-field) predictive encoding includes the following procedure: A screen picture (hereinafter simply referred to as "picture") which is temporally approximate to a current screen picture (frame or field) to be encoded is employed as a reference picture for predicting values of the pixel data of the current picture. Differences (prediction errors) between the predicted values and the pixel data of the current picture are obtained, and then the prediction errors are encoded. The predicted values are formed by data of reference picture pixels (generally pixels of a motion-compensated reference picture in moving picture encoding) corresponding to the current picture pixels to be encoded. When the pictures have high temporal (time) correlation, the difference (prediction error) is small and hence the quantity of data to be transmitted can be reduced to implement effective compression of information.

Systems of such predictive encoding include the MPEG standard which is directed to moving pictures. Systems of encoding and decoding picture data along the MPEG standard, which are explained in Nikkei Electronics, Mar. 14, 1994, pp. 82 to 116, for example, are now briefly described.

Pictures include I, P and B pictures, and the predictive system as employed depends on the type of the pictures.

FIG. 27 illustrates exemplary temporal (timewise) arrangement of pictures. This figure representatively shows nine pictures G1 to G9. The picture G3 is an I picture, which is subjected to intra-frame or intra-field encoding so that its pixel data themselves are encoded. The pictures G6 and G9 are P pictures, which are subjected to inter-frame or inter-field predictive encoding through past reproduced pictures. The pictures G1, G2, G4, G5, G7 and G8 are B pictures, which are predictively encoded through either past or future reproduced pictures or both of these pictures. These B pictures are predictively encoded through combinations of the I and P pictures or of the P pictures. The B pictures are not employed as reference pictures in predictive encoding and decoding. Referring to FIG. 27, the B pictures G1 and G2 are predictively encoded through the future I picture G3 which is temporally subsequent thereto. The B pictures G4 and G5 are predictively encoded through both of the I picture G3 which is a past reproduced picture and the P picture G6 which is a future reproduced picture temporally subsequent thereto. The B pictures G7 and G8 are predictively encoded through the P pictures G6 and G9 which are past and future reproduced pictures respectively.

FIG. 28 illustrates the structure of a single picture. Referring to FIG. 28, the single picture (field or frame) 1020 is divided into a plurality of segments called macro blocks. For the purpose of simplification, FIG. 28 illustrates such an exemplary structure that the picture 1020 is divided into 32 macro blocks MB#1 to MB#32. Processing of a moving picture is generally executed in units of the segments called macro blocks, in both encoding and decoding. Each of the macro blocks MB#1 to MB#32 generally includes 256 pixels arranged in 16 rows and 16 columns, as shown in FIG. 28. Therefore, the picture 1020 shown in FIG. 28 is formed by 128 by 64 pixels. The MPEG standard defines such conditions that the picture is structured by not more than 720 pixels per line (scanning line), not more than 576 lines per frame, and not more than 30 frames per second. However, DCT (discrete cosine transformation) processing and IDCT (inverse discrete cosine transformation) processing are performed in units of blocks of 8 by 8 pixels.

FIG. 29 schematically illustrates the structure (syntax) of a bit stream (a plural bit width) of picture data along the MPEG standard. Referring to FIG. 29, the bit stream is divided into a plurality of layers including a sequence layer, a GOP (group of pictures) layer, a picture layer, a slice layer, a macro block layer and a block layer in the order from the uppermost layer.

The block layer is formed by a block 1100 including a region 1100a including data of DCT coefficients and a region 1100b storing an end of block (EOB) data indicating the end of the block. The region 1100a stores DCT coefficient data of pixels of 8 rows and 8 columns serving as a unit of the DCT processing. When the last AC coefficient of the region 1100a is a nonzero coefficient, the end of block EOB of the region 1100b may not be employed in the block 1100. The DCT processing is performed to reduce spatial redundancy (high correlationship between adjacent pixels) in the picture thereby reducing the picture data quantity in encoding. DCT coefficients can be made localized in a low frequency coefficient region by the DCT processing. It is possible to enlarge values of low frequency components and substantially zeronize values of high frequency components in both of horizontal and vertical directions in space frequencies by quantizing the DCT coefficients. Thus, the picture data quantity is reduced.

The macro block layer is formed by a block 1110 including a prescribed number of (six) blocks 1100 and a macro block header 1115 storing attributes of the data of the macro blocks, motion vectors and the like.

The slice layer includes a slice 1120 which is formed by one or a plurality of macro blocks which are concatenated in picture scanning order. A slice header 1125 storing information indicating the vertical position of the slice on the screen and information such as a start code having a prescribed pattern indicating starting of this slice is provided at the head of the slice 1120.

The picture layer includes a picture 1130 which is formed by a plurality of slices 1120. A picture header 1135 storing information indicating the type (I, P or B picture) of the picture and a start code indicating starting of the picture is arranged at the head of the picture 1130.

The GOP layer includes a GOP 1140 including a plurality of pictures 1130. The pictures 1130 included in the GOP 1140 include at least one I picture and zero or a plurality of P or B pictures. A GOP header 1145 storing a start code indicating starting of the GOP and information such as a flag indicating that this GOP requires no reference from picture data of a GOP which is precedent thereto is arranged at the head of the GOP 1140.

The sequence layer includes a sequence 1150 which is formed by one or a plurality of GOPs 1140 each including one or a plurality of pictures 1130. A sequence header 1155 storing information such as the format of the screen is arranged at the head of the sequence 1150. This sequence header 1155 can be arranged at the head of every GOP 1140 which is included in the sequence 1150, in order to allow reproduction of pictures from an intermediate portion of the sequence. The sequence header 1155 stores information such as a start code having a prescribed pattern indicating starting of the sequence, horizontal and vertical sizes of the pictures, the picture rate (picture display speed), the bit rate, and the B picture cycle (the number of B pictures which are arranged between I and P pictures or between two P pictures).

FIG. 30 schematically illustrates the structure of a picture decoding unit. Referring to FIG. 30, the picture decoding unit includes a decoding circuit DC which receives encoded picture data (bit stream) from an encoding unit and carries out processing which is inverse to that in encoding for restoring original pixel data, and a memory device MR for storing the picture data restored in the decoding circuit DC. The encoded data which are supplied to the decoding circuit DC are predictively encoded data, as described above. In inter-frame predictive encoding, difference between pixel data of a current frame and a predictive frame (reference frame) is encoded. In order to perform decoding processing in the decoding circuit DC, therefore, it is necessary to carry out an operation which is inverse to that for obtaining the difference, i.e., an adding operation, through the predictive frame (reference frame). The memory device MR is provided for storing the reference frame picture data. A B picture employs two pictures as reference pictures, and hence the memory device MR must have a capacity for storing pixel data of at least two pictures. The memory device MR includes banks #1BK1 and #2BK2 storing two pictures respectively. In the following description, it is assumed that the encoded picture data are in a frame structure formed of a frame including both of pixel data of even and odd fields as a unit. In this case, each of the banks #1BK1 and #2BK2 has a storage capacity for storing picture data of one frame.

As hereinabove described, the picture data are encoded and decoded in units of macro blocks. As shown in FIG. 31A, macro blocks MB of a picture 1030 are successively encoded in the order of numbers shown in the figure. Referring to FIG. 31A, the picture 1030 is divided into N and M macro blocks in the horizontal and vertical directions respectively. For convenience, each group of N macro blocks MB which are aligned along the horizontal direction is called "one macro block line" in the following description. In each macro block line, the encoding processing progresses rightward from the macro block which is positioned on the left end of the screen. After encoding of the final macro block in a certain macro block line, such as a macro block MB(N), for example, is completed, a macro block, such as a macro block MB(N+1), for example, which is positioned on the left end of the next macro block line is encoded. The encoded picture data are transmitted from the encoding unit in the order of the encoding of the macro blocks, as shown in FIG. 31B.

The decoding circuit (see FIG. 30) decodes the encoded data which are supplied in the sequence shown in FIG. 31B, similarly in units of the macro blocks MB. Therefore, an output sequence of the decoded picture data which are outputted from the decoding circuit to the memory device is identical to that shown in FIG. 31B.

On the other hand, a general display unit displays a picture on a unit of "pixel line" from the top to the bottom of the screen in accordance with a "raster scan" system. The term "pixel line" indicates a set of pixels which are aligned along the horizontal direction on the screen.

FIG. 32 illustrates a display sequence of pixel data on the screen in the case of displaying a picture in a non-interlace system. Referring to FIG. 32, a picture 1040 of one screen includes 2L pixel lines. Display order of the pixel lines is indicated on the left side of the screen picture 1040. In the case of non-interlace display, the pixels are successively displayed from that on the left upper end of the screen picture 1040. Namely, the display rightwardly progresses on the screen from the pixel which is arranged on the left end in each pixel line. When display of the final pixel (pixel on the right end of the picture 1040) is completed in one pixel line, the pixel on the left end of the next (adjacent) pixel line is displayed. This display sequence is repeatedly executed until display of the final pixel line (the pixel line denoted as 2L) is completed.

FIG. 33 illustrates a display sequence of a picture in an interlace display system. Also in FIG. 33, a picture 1040 includes 2L pixel lines. In this interlace display system, pixel data of the uppermost pixel line on the picture 1040 are first displayed. Then, the next pixel line is interlaced so that pixel data of the second adjacent pixel line are displayed. Thereafter every other pixel lines are interlaced to display the pixel data of the picture 1040. When the process reaches the lower pixel line L of the picture 1040, it returns to the upper side of the picture 1040, to display the pixel data of the interlaced pixel lines. When display of the pixel data of the interlaced pixel lines is completed, a next frame picture is displayed. Namely, the pixel data of the odd pixel lines of the picture 1040 are first displayed in this interlace display, and then the pixel data of the even pixel lines are displayed after display of the pixel data of all odd pixel lines is completed. In the case of the interlace display, one frame is formed by odd and even fields, so that display of the even field is carried out after completion of display of the odd field.

Comparing FIG. 31 with FIGS. 32 and 33, it is clearly understood that the output sequence of the decoded data is different from the display order of the pixel data which are displayed on the display unit. Therefore, a function of converting the sequential order of the pixel data is required for a unit having picture decoding and display functions. The function of converting the arrangement order of the pixel data is implemented through the memory device. Namely, the pixel data are written in the memory device in the order of the decoding of pixel data, while they are read along the order of the displaying of pixel data. In other words, this conversion function is implemented by decoding supplied encoded picture data, writing the decoded data in the memory device in the order of the macro blocks on a macro block basis, and reading the pixel data from the memory device pixel by pixel along the order of the non-interlace or interlace system in accordance with the display system of the display unit.

FIG. 34 schematically illustrates the structure of a conventional decoding and display unit having functions of decoding and displaying picture data. Referring to FIG. 34, the conventional decoding and display unit includes a decoding/display circuit DDC which decodes pixel data included in supplied encoded picture data (bit stream), restores original pixel data and outputs the restored data to a display unit DP for display, and a memory device MR for storing reference picture data employed in the decoding processing in the decoding/display circuit DDC and pixel data for display. The memory device MR includes a bank #1 (BA1) for storing I or P pictures, a bank #2 (BA2) for storing pixel data of P pictures, and banks #3 (BA3) and #4 (BA4) for storing pixel data of B pictures. A picture data processing sequence of the decoding/display unit shown in FIG. 34 is now described with reference to FIG. 35, which is a timing chart thereof.

The decoding/display circuit DDC is supplied with pixel data of respective pictures in the order which is different from that in display. Pixel data of temporally subsequent pictures, i.e., future pictures, are employed in decoding of B pictures, and hence the future pixel data are transmitted in advance of B pictures. The decoding/display circuit DDC successively decodes the picture data which are supplied from a transmission side in accordance with the transmission order. In display, pictures are transposed into the display order along the types (I, P, B) of the pictures, so that the pixel data of the pictures are read in the order for display and supplied to the display unit DP. It is assumed that the banks #1 to #4 (BA1 to BA4) of the memory device MR store no valid pixel data at present.

In a period T1, the decoding/display circuit DDC is supplied with picture data of an I picture I3, to decode the data. The decoded picture data of the I picture I3 are written in the bank #1 (BA1) of the memory device MR. Upon completion of the period T1, the bank #1 stores all pixel data of the I picture I3.

In a next period T2, the decoding/display circuit DDC is supplied with encoded data of a B picture B1. The decoding/display circuit DDC decodes the encoded data of the B picture B1, and writes the decoded pixel data in the bank #3 (BA3). Upon completion of the period T2, the bank #3 (BA3) stores all pixel data of the B picture B1.

In a period T3, the decoding/display circuit DDC is supplied with encoded data of a next B picture B2. In synchronization with starting of a decoding processing operation for the B picture B2 in the period T3, the pixel data of the B picture B1 are read from the bank #3 (BA3), supplied to the display unit DP and displayed thereon. Namely, decoded picture data of the B picture B2 are written in the bank #4 of the memory device MR while the pixel data of the B picture B1 are read from the bank #3 (BA3) and supplied to the display unit DP in the period T3. Writing is successively performed in units of macro blocks in writing into each bank, while the pixel data are successively read pixel by pixel in the scan order along the display system in reading from each bank. After completion of the period T3, the bank #4 (BA4) stores all pixel data of the B picture B2. Upon the completion of the period T3, display of the pixel data of the B picture B1 on the display unit DP is also completed.

In a period T4, encoded data of a P picture P6 are supplied and decoded, and the decoded pixel data are written in the bank #2 (BA2). In this period T4, the pixel data of the B picture B2 are successively read from the bank #4, supplied to the display unit DP and displayed thereon. Thereafter encoded data of a B picture B4, a B picture B5, a P picture P9 and a B picture B7 are sequentially supplied and decoded, and the decoded picture data are successively written in the banks #3 (BA3), #4 (BA4), #1 (BA1) and #3 (BA3) in periods T5, T6, T7 and T8 respectively. In parallel with such writing of the decoded picture data, the pixel data of the I picture I3, the B picture B4, the B picture B5 and the P picture P6 are read from the banks #1 (BA1), #3 (BA3), #4 (BA4) and #2 (BA2) respectively, supplied to the display unit DP and displayed thereon in the periods T5, T6, T7 and T8 respectively. The order of transmitting and decoding of the encoded pictures is made different from that of the displaying of the pictures, and therefore necessary future picture data are previously stored in the memory device MR when past and future picture data are employed in bidirectional prediction of B pictures, whereby the B pictures can be decoded.

As hereinabove described, the decoding/display unit having the display function employs the banks #3 and #4 for storing two frame pixel data, in order to convert the order of pixels (to convert the pixel data which are supplied in units of macro blocks into raster scan order). The storage capacity for two frames (pictures) is necessary for preventing pixel data which are not yet read for display from substitution by newly supplied decoded pixel data. For example, the I picture I3 is supplied in the period T1 and displayed in the period T5, and no pixel data can be stored in the bank #1 during these periods.

When the pictures are decoded and displayed at the same rate, it is possible to decode and display the pixel data within the same time by synchronizing starting of picture decoding with starting of picture display (output of pixel data from the memory device to the display unit). As for each B picture, display thereof is carried out in a period which is next to that for decoding As to the banks #3 (BA3) and #4 (BA4) storing the pixel data of the B pictures, one of these banks is subjected to writing of picture data while the other one is subjected to reading of picture data for display. In this memory device MR, therefore, substitution of data is completely prevented since memory areas for data writing are completely separated from those for data reading.

In the structure shown in FIG. 34, however, the memory device MR is required to have a storage capacity for storing pixel data of four frames. When a processed picture has resolution of the NTSC system (720 pixels by 480 lines), for example, pixel data of one frame are 720×480×8×1.5=3.96 Mbits, i.e., about 4 Mbits, assuming that one pixel data is formed by 8 bits. The coefficient 1.5 is employed in the calculation of the storage capacity, in consideration of such a state that the pixel number of two kinds of chrominance signals is half the pixel number of a luminance signal. In the conventional decoding/display unit, therefore, the storage capacity of the memory device is increased in order to convert the arrangement order of the display pictures, disadvantageously leading to increase of the device scale.

SUMMARY OF THE INVENTION

An object of the present invention is to provide a picture decoding/display unit which can reduce the storage capacity of a memory unit.

Another object of the present invention is to provide a picture decoding/display unit which can decode and display picture data while efficiently utilizing a memory device.

A picture decoding/display unit according to a first aspect of the present invention includes a decoder which extracts pixel data included in a received bit stream and performs prescribed decoding processing on the extracted pixel data for restoring original pixel data. This decoder includes circuitry for identifying whether the type of a frame to which the pixel data included in the bit stream belong is an I/P picture employed as a reference picture in decoding or a B picture not employed as a reference picture but subjected to only display.

The picture decoding/display unit according to the first aspect further includes a storage which stores pixel data of a B picture restored by the decoder in accordance with a B picture identification indication signal from the decoder, a reader which reads the pixel data stored in the storage for outputting to the display unit, and a controller which is coupled to the decoder and the reader for controlling operation timings of the decoder and the reader so that time difference between a timing for starting decoding of the B picture and that for outputting the pixel data of the B picture from the reader to the display unit is one field period required for outputting one field pixel data of the B picture from the reader to the display unit.

A picture decoding/display unit according to a second aspect of the present invention includes a decoder which receives predictively encoded pixel data and carries out prescribed decoding processing for restoring original pixel data, a storage which stores the restored pixel data received from the decoder, a reader which reads the pixel data from the storage for outputting to a display unit for display thereof, and a controller which is coupled to the reader and the decoder for starting an operation of decoding pixel data of a next frame in response to reading of picture data of a field to be displayed last of a certain frame from this reader.

A picture decoding/display unit according to a third aspect of the present invention includes a decoder which receives predictively encoded pixel data and carries out prescribed decoding processing for restoring original pixel data.

The picture decoding/display unit according to the third aspect further includes a storage for storing the restored pixel data outputted from the decoder, a reader successively reading the pixel data, which are stored in the storage, in units of fields and outputting the read out pixel data for display on a display unit, and a controller which is coupled to the reader and the decoder for controlling the reader to again read the pixel data from the storage in units of fields every prescribed number of frames in accordance with pulldown conversion information while starting decoding of pixel data of a next frame in response to output of pixel data of a field to be displayed last among those of a certain frame from the storage to the display unit.

A picture decoding/display unit according to a fourth aspect of the present invention includes decoder which decodes predictively encoded pixel data of a picture included in a received bit stream and restores original pixel data, a storage for storing the restored pixel data from the decoder, a reader which reads the pixel data from the storage and outputs the read out pixel data for display on a display unit, and a controller which starts an operation of reading the pixel data from the reader in accordance with a decoding start indication from the decoder. The controller includes circuitry which brings a time difference between starting of the decoding by the decoder means and reading of a first field of a certain frame from the reader into a time required for outputting pixel data of one field for display.

In the picture decoding/display unit according to the first aspect, starting of decoding and that of display of the B picture has a time difference of one field period. Therefore, the restored pixel data of the B picture are read from the storage and supplied to the display unit after a lapse of one field period, whereby storage of pixel data corresponding to one field and reading of those corresponding to a precedent field can be carried out in the same period through storage having a storage capacity of one frame worthy amount of pixel data. Thus, the storage capacity of the memory device employed for storing B pictures can be reduced.

In the picture decoding/display unit according to the second aspect, pixel data of a field to be displayed last of a certain frame are read in synchronization with starting of decoding of pixel data of a next frame, whereby picture data can be decoded and displayed with one field time difference with respect to a B picture in both of interlace and non-interlace picture display systems, and the picture data can be correctly displayed and decoded while reducing the storage capacity of the memory device. Further, it is possible to readily accommodate the case of converting the display speed by 3:2 pulldown conversion without increasing the storage capacity of the storage, with no requirement for complicated timing control.

In the picture decoding/display unit according to the third aspect, decoding processing of the decoder is started in reading of pixel data of the last field when picture data are read again, whereby it is possible to correctly decode and display the picture data while preventing substitution of the picture data by overwriting without increasing the storage capacity of the memory device also in conversion of the display speed such as 3:2 pulldown conversion.

In the picture decoding/display unit according to the fourth aspect, pixel data of the first field of the next frame are read for display on the display unit with time difference of one field from starting of decoding. Thus, it is possible to correctly display and decode picture data while reducing the storage capacity of the memory device.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 7A and 7B illustrate display and decoding fashions in a final pixel line of an odd field in the memory device shown in FIG. 5 respectively;

DESCRIPTION OF THE PREFERRED EMBODIMENTS

Embodiment 1

Figure 1:
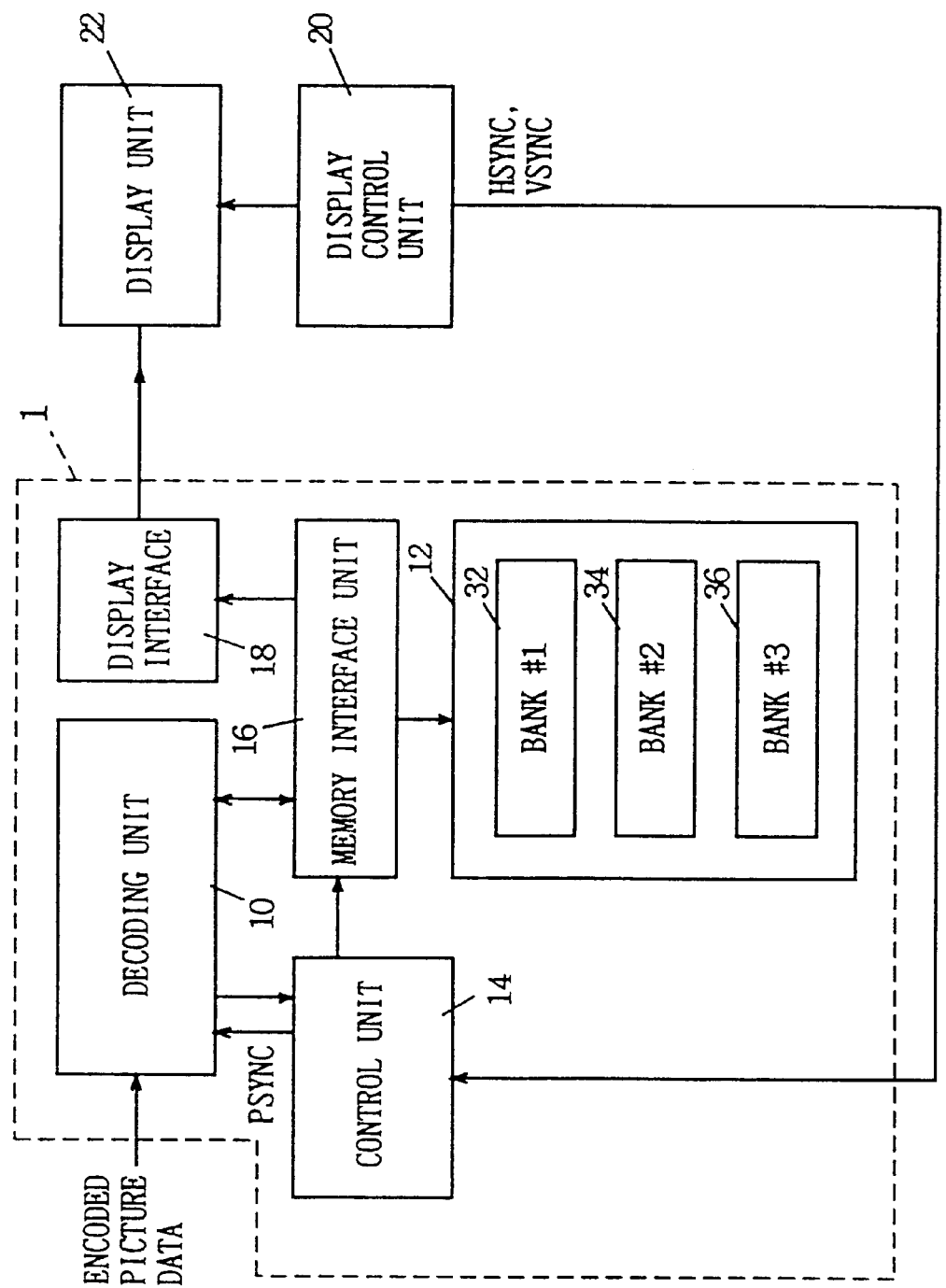
FIG. 1 schematically illustrates the overall structure of a picture decoding/display unit according to a first embodiment of the present invention.
Figure 29:
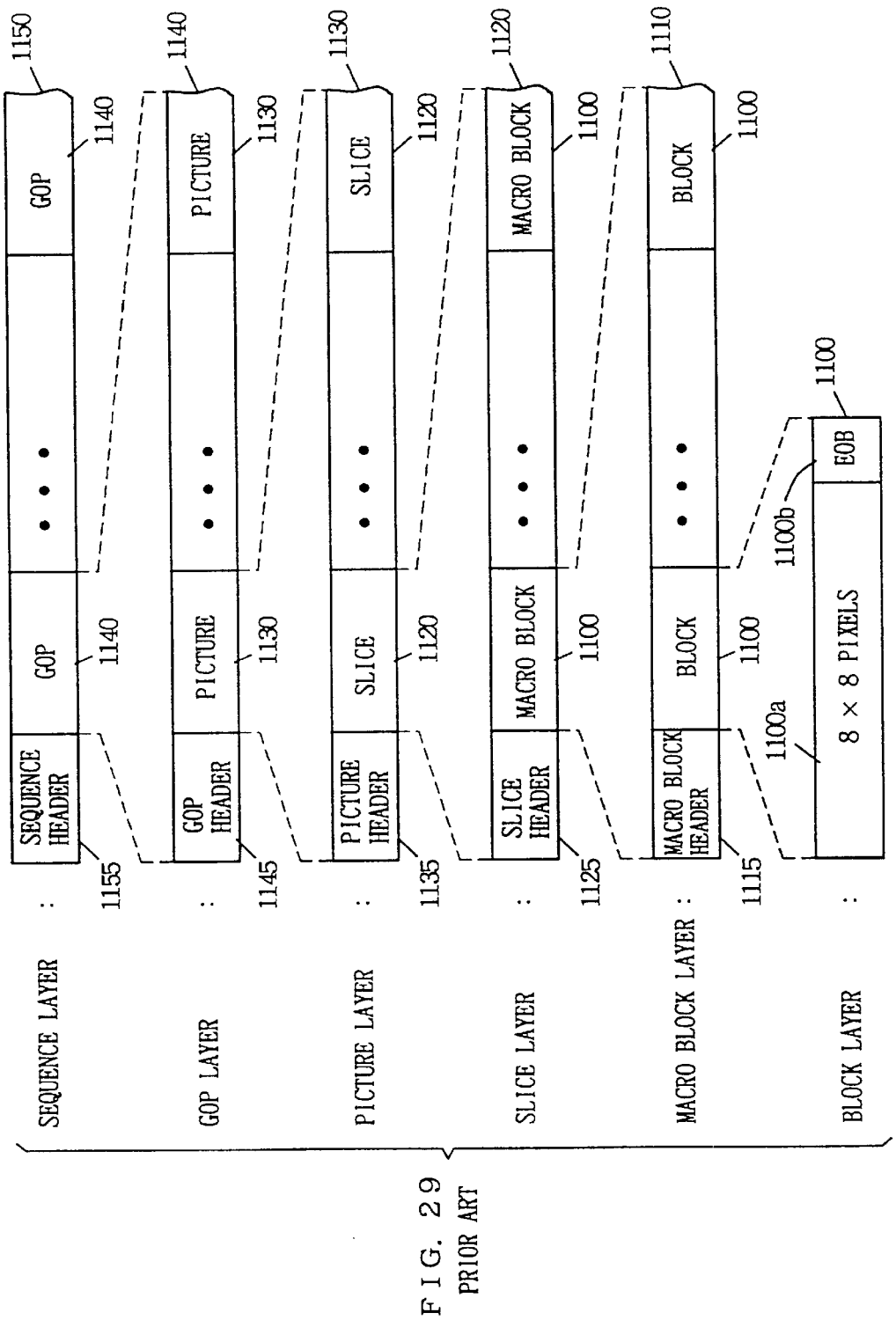
FIG. 29 illustrates the syntax of picture data.
Figure 30:
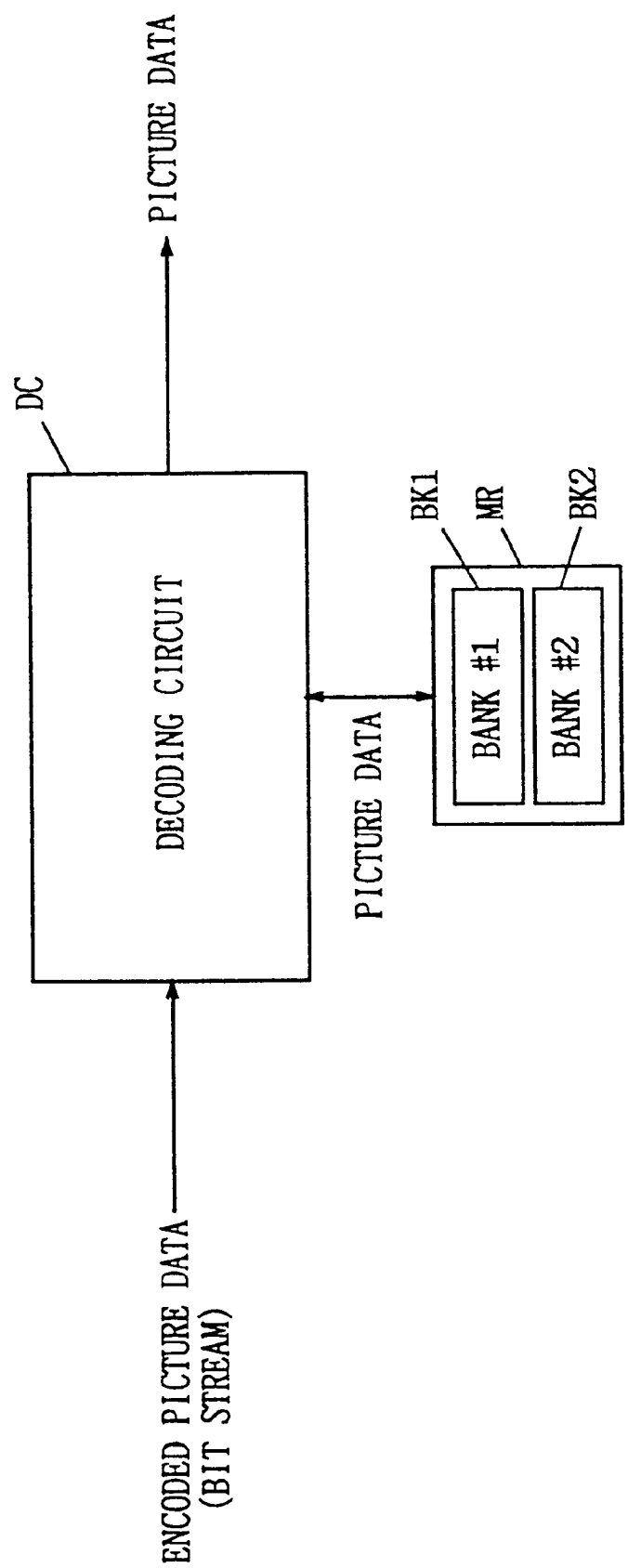
FIG. 30 schematically illustrates the structure of a conventional picture decoding/display unit.
Figure 31A:
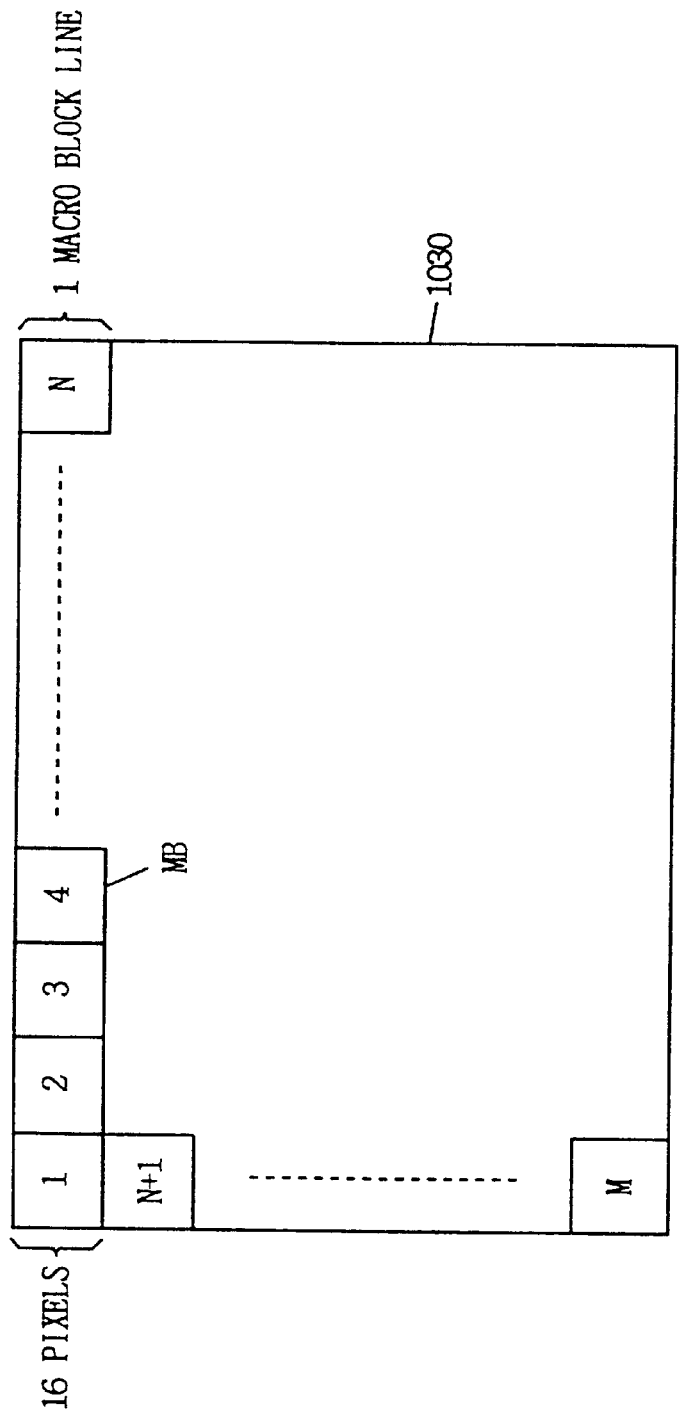
FIGS. 31A and 31B illustrate the structure of a picture and transmitted encoded data respectively.
Figure 31B:
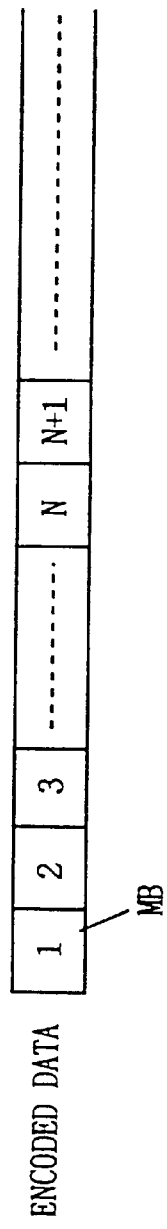
Figure 32:
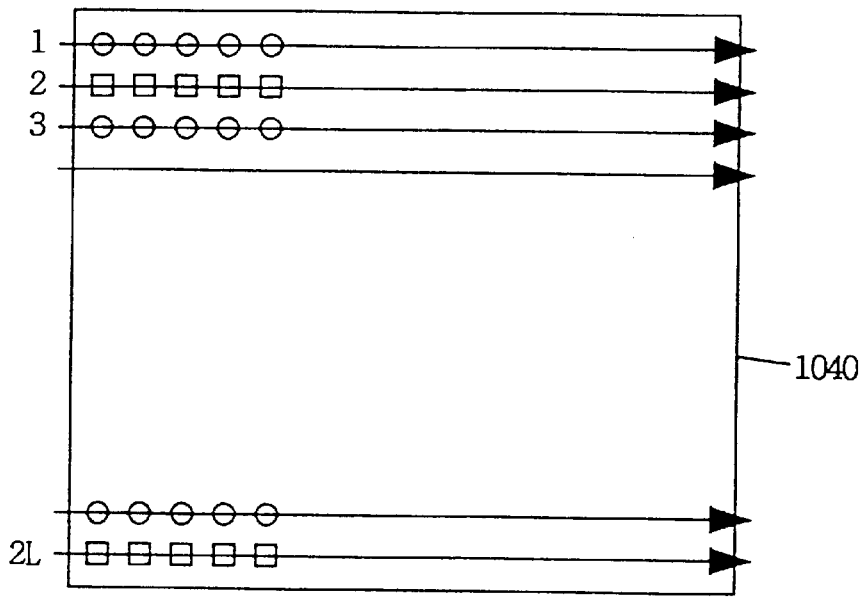
FIG. 32 is adapted to illustrate picture display in a non-interlace system.
Figure 33:
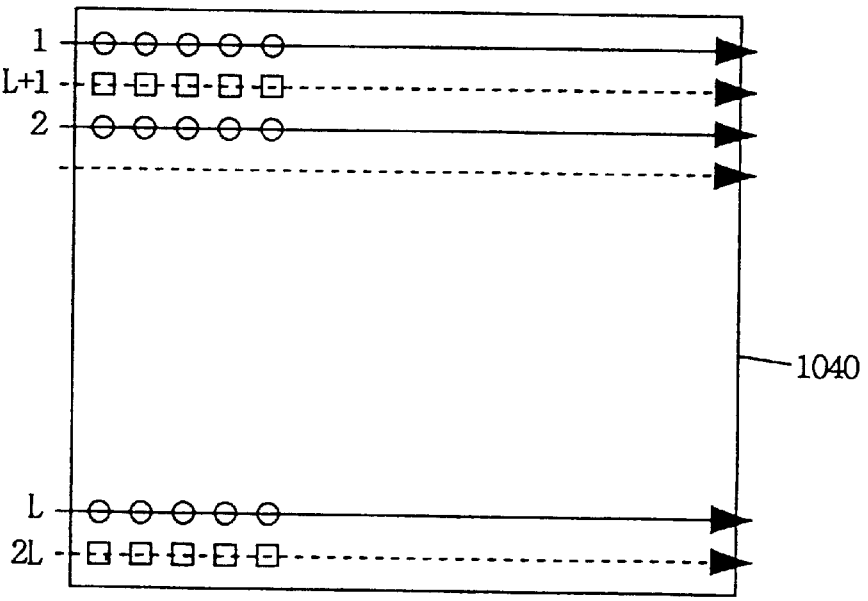
FIG. 33 illustrates a picture display sequence along an interlace system.
Figure 34:
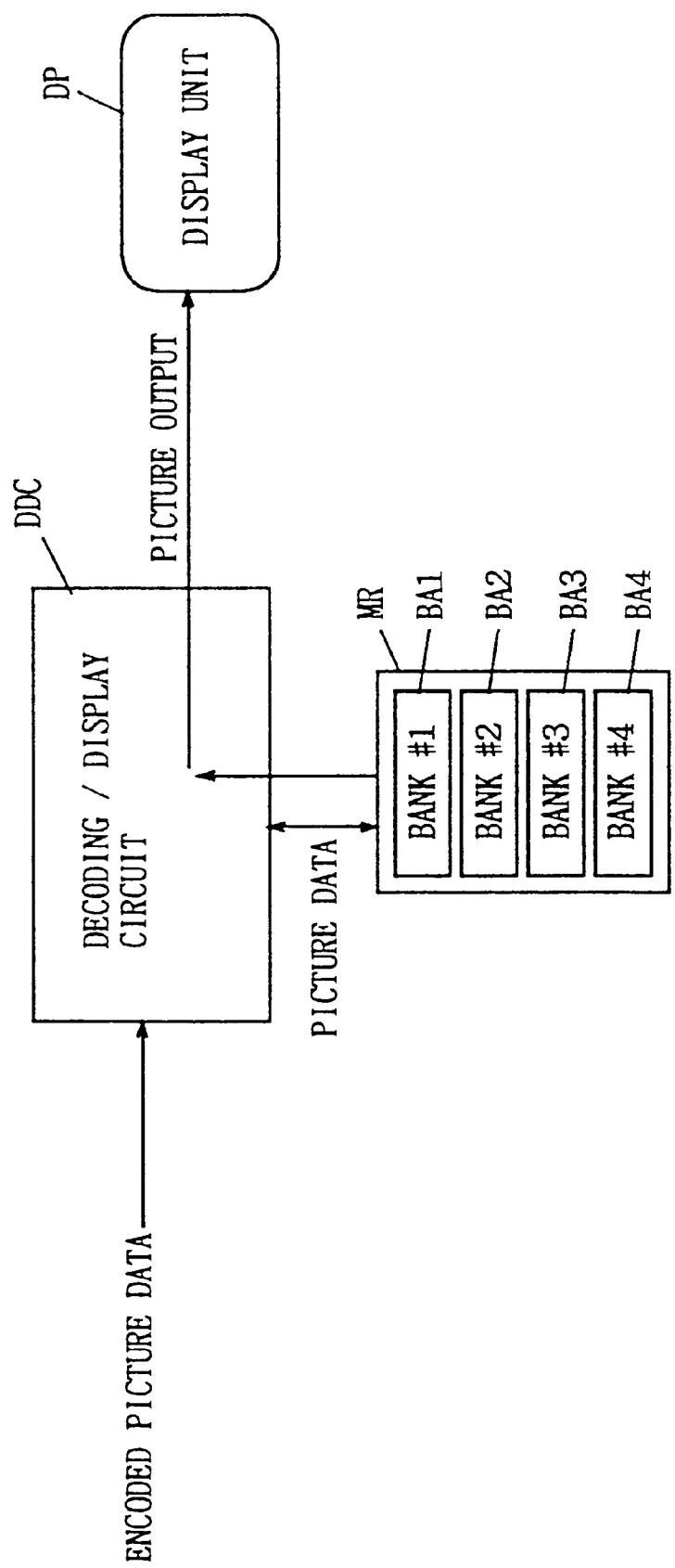
FIG. 34 schematically illustrates the structure of a conventional picture decoding/display unit.
Figure 35:
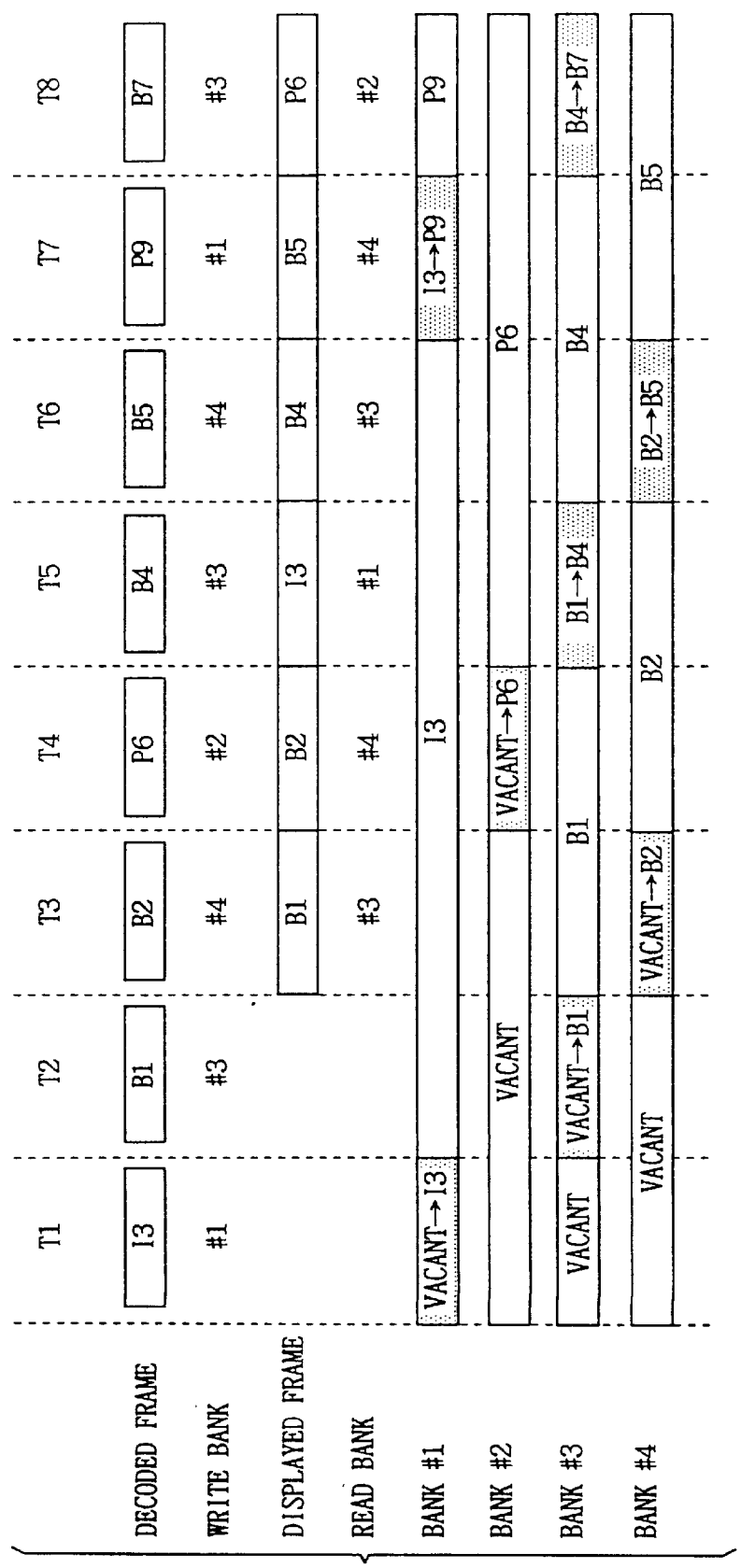
FIG. 35 illustrates an operation sequence of the picture decoding/display unit shown in FIG. 34.

FIG. 1 schematically illustrates the structure of a picture decoding/display unit 1 according to a first embodiment of the present invention. Referring to FIG. 1, the picture decoding/display unit 1 includes a decoding unit 10 which receives encoded picture data supplied in the form of a bit stream and carries out prescribed decoding processing on encoded pixel data included in the encoded picture data for restoring original pixel data, a memory device 12 which stores the pixel data restored by the decoding unit 10, and a control unit 14 which controls an operation such as an operation timing of the decoding unit 10 as well as an access operation to the memory device 12. In the following description, it is assumed that the encoded picture data also include header information such as properties and attributes of pictures. The term "pixel data" is employed for indicating data of respective pixels, while the term "picture data" is employed for indicating the overall data of one picture (field or frame) without specific reference to a pixel in a picture. The decoding unit 10, the internal structure of which is described later, has both functions of decoding the encoded pixel data and analyzing the header information (see FIG. 29).

The control unit 14 generates a picture synchronizing signal PSYNC deciding a decoding processing start timing of the decoding unit 10 in accordance with horizontal and vertical synchronizing signals HSYNC and VSYNC which are supplied from an externally provided display control unit 20, and supplies the signal PSYNC to the decoding unit 10. The picture synchronizing signal PSYNC from the control unit 14 decides a decoding period for one picture, which in turn is assumed as a frame in the following description. The horizontal synchronizing signal HSYNC decides one horizontal period (a period necessary for displaying pixel data of one pixel line) which is employed in display of pixel data on a display unit 22, while the vertical synchronizing signal VSYNC decides a period for displaying pixel data of one field on the display unit 22.

A memory interface unit 16 is arranged between the decoding unit 10 and the memory device 12, and a display interface 18 is arranged between the memory interface unit 16 and the display unit 22. The memory interface unit 16 generates data write and read addresses the memory device 12 under control of the control unit 14, and establishes a data transmission path between the memory device 12 and the decoding unit 10 or the display interface 18. The display interface 18 successively outputs pixel data which are supplied from the memory interface 16, in accordance with a pixel data display speed on the display unit 22.

The memory device 12 includes banks #1 (32), #2 (34) and #3 (36) which are accessible independently of each other. The banks #1 and #2 (32 and 34) are employed for storing pixel data of I pictures (frames) or P pictures. The bank #3 (36) is employed for storing pixel data of B pictures. Each of the banks #1 to #3 (32 to 36) has a storage capacity of one frame worthy amount of pixel data, and is formed by a DRAM (dynamic random access memory), for example.

Figure 2A:
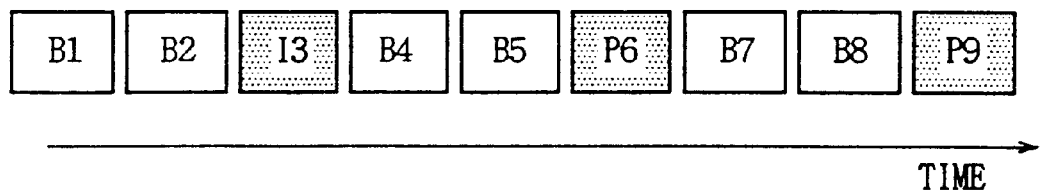
FIG. 2A illustrates exemplary frame display order employed in the present invention.
Figure 2B:
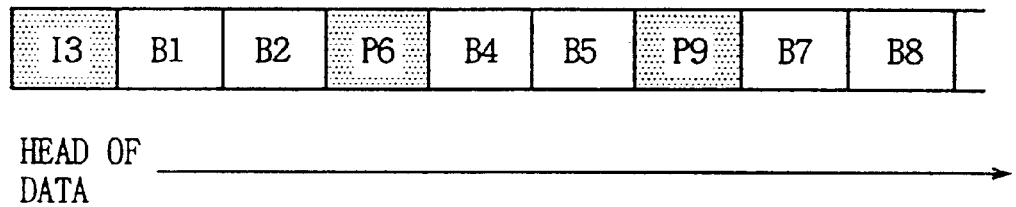
FIG. 2B illustrates exemplary order of decoding of transferred frames.

FIGS. 2A and 2B illustrate exemplary display order and exemplary decoding order of pictures (frames) respectively. As shown in FIG. 2A, the pictures (hereinafter referred to as frames) are displayed on the display unit in the order of B frames B1 and B2, an I frame I3, B frames B4 and B5, a P frame P6, B frames B7 and B8 and a P frame P9.

On the other hand, the frames are decoded in the order of the I frame I3, the B frames B1 and B2, the P frame P6, the B frames B4 and B5, the P frame P9 and the B frames B7 and B8, as shown in FIG. 2B. This frame decoding order is identical to transmission order for the frames which are transmitted as encoded data. As previously described, the I frames are formed by pixel data which are encoded with no reference to pixel data of other frames. The P frames are formed by pixel data which are encoded through pixel data of temporally precedent (past) I and/or P frames. In this embodiment, the B frames are formed by pixel data which are encoded through pixel data of temporally precedent and subsequent (past and future) pairs of I and/or P frames.

In decoding, therefore, it is necessary to employ pixel data of future frames, and hence the pixel data of the future frames must be decoded in advance. Thus, the frame display order is different from the frame decoding order (order of the transmitted frames). For example, the B frames B4 and B5 are precedent to the P frame P6 in the display order. In decoding, however, the B frames B4 and B5 are decoded subsequently to the P frame P6. This is because prediction (forward prediction) employing the I frame I3 as a reference picture and prediction (backward prediction) employing the pixel data of the P frame P6 are carried out in order to decode (and encode) the B frames B4 and B5.

The B frames are not employed as reference pictures in decoding, and are merely displayed. Therefore, the bank #3 (36) included in the memory device 12 shown in FIG. 1 is a storage area which is necessary for displaying decoded data, and the banks #1 (32) and #2 (34) are storage areas which are required for decoding processing at the least.

Figure 3:
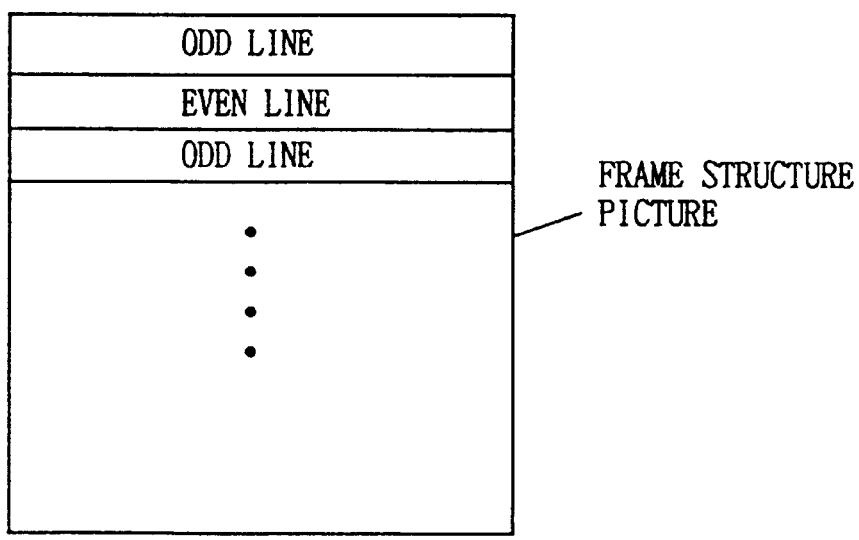
FIG. 3 illustrates an exemplary structure of pixels of a macro block in a frame encoding predictive system.

FIG. 3 illustrates arrangement of pixel data of a picture having a frame structure and encoded in the unit of frame. The encoded picture data having the frame structure include both of pixel data on odd and even lines on the display screen. The pixel data on the odd lines form an odd field, and those on the even lines form an even field.

Figure 4:
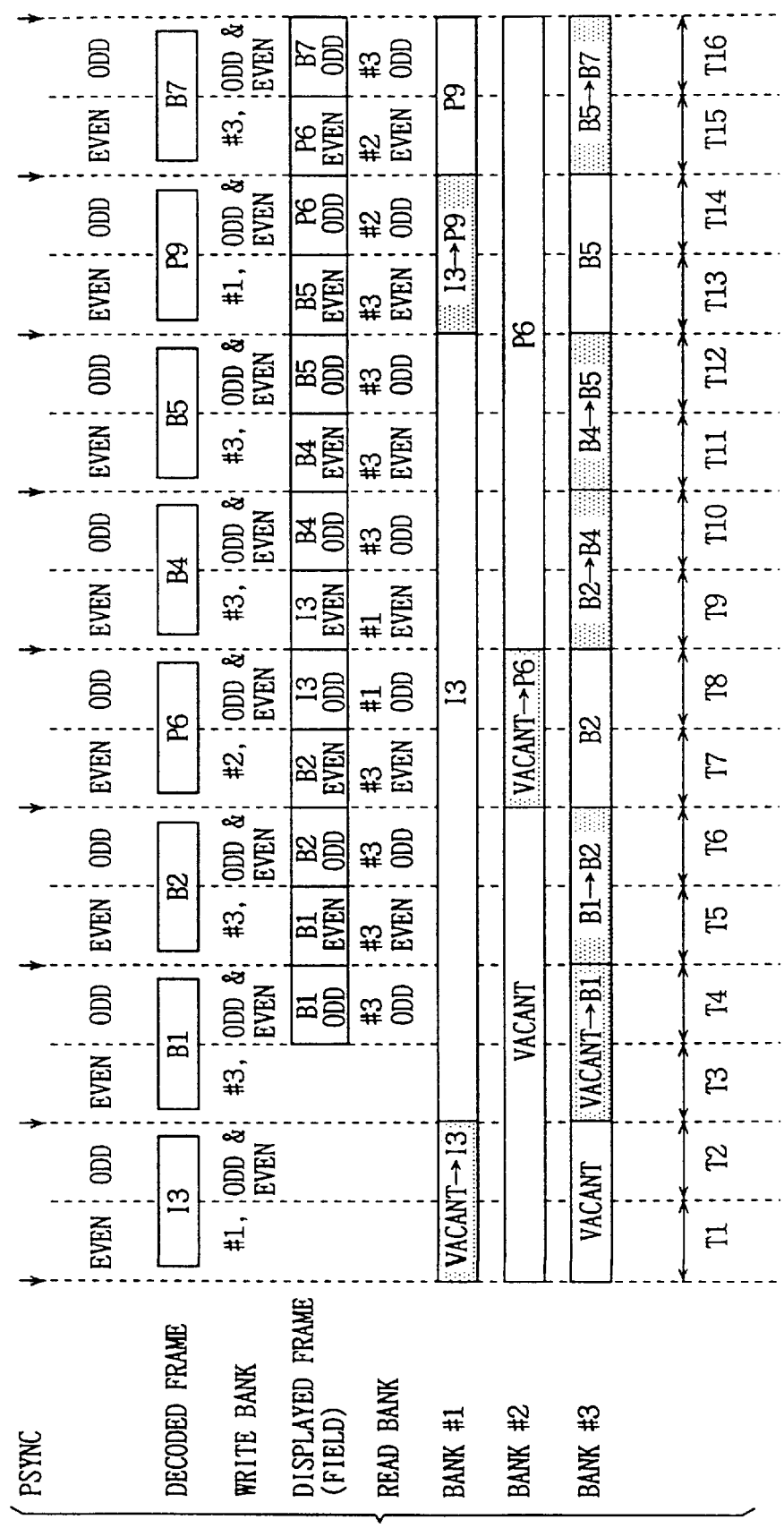
FIG. 4 illustrates an operation sequence of the picture decoding/display unit according to the first embodiment of the present invention.

FIG. 4 illustrates frame decoding and display sequences in the first embodiment of the present invention. Referring to FIG. 4, the frames are displayed and decoded in the order shown in FIG. 2. As hereinabove described, each frame comprises odd and even fields, and the display is made in the order of odd and even fields in a non-interlace system, for example.

First, consider that the banks #1 to #3 (32, 34 and 36) of the memory device 12 store no valid pixel data in initial states. Encoded picture data are successively supplied to the decoding unit 10, which in turn decodes the pixel data of the respective frames in synchronization with the picture synchronizing signal PSYNC from the control unit 14. In periods T1 and T2 shown in FIG. 4, the pixel data of the I frame I3 are decoded so that the pixel data restored by this decoding are stored in the bank #1 (32). The I frame is formed by even and odd fields, and hence two field periods T1 and T2 are necessary for decoding this I frame I3. Since the pictures are encoded in units of the frames (in the frame structure), both of the pixel data of the odd and even fields are written in prescribed areas of the bank #1 in the respective field periods T1 and T2. One frame period (two field periods) is decided by the picture synchronizing signal PSYNC. The field period is decided by the vertical synchronizing signal VSYNC (and the horizontal synchronizing signal HSYNC) from the display control unit 20 (see FIG. 1).

When a field period T3 is started, decoding of the B frame B1 is started in turn. Pixel data obtained by decoding the B frame B1 are stored in the bank #3 (36). Upon completion of the period T3, pixel data of half of the B frame B1 are completely decoded. The pixel data decoded in the period T3 include both of odd and even fields, which are stored in odd and even field pixel storage areas of the bank #3 (36) respectively.

In a field period T4, the remaining encoded pixel data of the B frame B1 are decoded so that the decoded pixel data are stored in the remaining storage area of the bank #3 (36). In this field period T4, odd field pixel data are simultaneously read from the bank #3 (36), supplied to the display unit 22 through the memory interface unit 16 and the display interface 18, and displayed thereon.

The processing speed of decoding the encoded pixel data is identical to the display speed of the pixel data (or the speed of reading the pixel data from the memory device 12). Namely, pixel data of one frame are decoded and written in the corresponding bank of the memory device 12 in one frame period which is defined by the picture synchronizing signal PSYNC, while pixel data of one frame are displayed (read) in this one frame period. The banks #1 (32) to #3 (36) may be accessible independently of each other. Alternatively, the memory device 12 may carry out only either data reading or data writing at a time. In this structure, reading of pixel data of a reference frame (I or P frame) for decoding, writing of decoded pixel data in the memory device, and reading of pixel data to be displayed are executed in a prescribed sequence within one frame period. In this case, what is required is such a condition that the speed of decoding encoded data of one frame for obtaining restored pixel data is identical to the speed of reading pixel data from the memory device 12 for display, i.e., the speed of displaying the pixel data on the display unit.

In other words, the average time which is required for decoding the pixel data for writing into the memory device 12 must be identical to that required for reading the pixel data from the memory device 12 for displaying on the display unit 22. In the following description, the pixel data decoding processing speed is referred to as being identical to the pixel data display speed with all these conditions included.

The pixel data of the odd field of the B frame B1 are read in the field period T4. During this period, the odd field of the B frame B1 is similarly decoded and written in the bank #3 of the memory device 12. As described later in detail, the final odd pixel line of the B frame B1 is completely decoded and stored in the bank #3 (36) at the final time of the field period T4. Therefore, decoded pixel data can be correctly read and displayed on the display unit 22.

When a field period T5 is started, decoding of the next B frame B2 is started. In this field period T5, the even field pixel data of the B frame B1 are read from the bank #3 (36) of the memory device 12 and displayed. At the beginning of the field period T5, the bank #3 (36) exclusively stores the pixel data of the B frame B1, and display of the even field of the B frame B1 is correctly started. The pixel data of the B frame B2 are decoded in the field period T5, so that the pixel data of the odd and even fields of the B frame B2 are successively stored in the bank #3 (36). As described later in detail, decoding of the pixel data of the B frame B2 progresses up to only about half of the frame B2 in this field period T5. Thus, the even field pixel data of the B frame B1 can be prevented from being rewritten by the decoded pixel data of the B frame B2 before being read on the display unit, so that they can be correctly displayed.

In a field period T6, the pixel data of the remaining half of the B frame B2 are decoded and stored in the bank #3 (36). In this field period T6, the even field pixel data of the B frame B2 are newly read from the memory device 12 and displayed on the display unit 22. Decoding of a half of the B frame B2 has already been completed at the beginning of the field period T6 similarly to the display operation of the B frame B1, and this display is correctly started. Thereafter the display operation so progresses that the pixel data of the final pixel line of the odd field of the B frame B2 are displayed at the end of the field period T6. Decoding of the B frame B2 is completed at the end of the field period T6, whereby the pixel data of the final pixel line of the odd fields of the B frame B2 are correctly displayed.

When a field period T7 is started, decoding of the P frame P6 is started. The decoded pixel data of the P frame P6 are stored in the bank #2 (34). Thus, the pixel data of the P frame P6 are successively stored in the bank #2 (34), which has hitherto stored no valid pixel data. In this field period T7, the even field pixel data of the B frame B2 are read from the memory device 12 and displayed on the display unit 22. The pixel data are written in and read from different banks, whereby no substitution of the pixel data is caused in this period.

In a field period T8, the remaining pixel data of the P frame P6 are decoded so that the decoded pixel data are stored in the remaining storage area of the bank #2. In this field period T8, the pixel data of the I frame I3 stored in the bank #1 are read and displayed. Also in this period, the pixel data are written in and read from different banks, whereby the display operation is correctly executed.

In a field period T9, the data of the B frame B4 are decoded and written in the memory device. In this field period T9, the even field pixel data of the I frame I3 are read from the memory device 12 and displayed on the display unit 22. Also in this field period T9, the data are written in and read from different banks, whereby correct display and decoding are implemented. In this field period T9, the pixel data of the B frame B2 which are stored in the bank #3 (36) are successively rewritten by the pixel data of the B frame B4 in accordance with the result of writing.

When a field period T10 is started, the remaining pixel data of the B frame B4 are decoded and written in the memory device, while the odd field pixel data of the B frame B4 are read and displayed at the same time. In this field period T10, the pixel data are written and read in a similar manner to the field period T4 or T6, whereby correct decoding and display are carried out.

In field periods T11 and T12, the pixel data of the next B frame B5 are decoded and stored in the bank #3 (36), while the even field pixel data of the B frame B4 and the odd field pixel data of the B frame B5 are read and displayed in the field periods T11 and T12 respectively.

When a field period T13 is started, the pixel data of the P frame P9 are decoded and stored in the bank #1 (32). The pixel data stored in the bank #1 (32) are rewritten by the pixel data of the P frame P9. The pixel data of the I frame I3 are not further employed as a reference frame when the B frames B4 and B5 are completely decoded. The reference frame for the P frame P9 is the P frame P6, whose pixel data are stored in the bank #2 (34). Therefore, correct decoding and display operations can be executed with no problem.

In a field period T14, the odd field pixel data of the P frame P6 are read and displayed, while the remaining pixel data of the P frame P9 are decoded and written at the same time.

When a field period T15 is started, the B frame B7 is decoded and stored in the bank #3 (36), while the even field pixel data are read and displayed among the pixel data of the P frame P6 which are stored in the bank #2 (34). Also in this period, the data are written in and read from different banks, whereby substitution of the pixel data is prevented.

In a field period T16, the remaining pixel data of the B frame B7 are decoded and stored in the bank #3, while the odd field of the B frame B7 is read and displayed at the same time.

As hereinabove described, time difference between writing in and reading from the memory device is substantially one field time as to the pixel data of each B frame, and correct decoding and display of the B frame can be implemented also by processing pixel data of the B frame only through the bank #3 (36) having the capacity of storing pixel data of one frame. As to the I and P frames, the pixel data are not written in and read from the same bank in the same field period, whereby no problem is caused.

Figure 5:
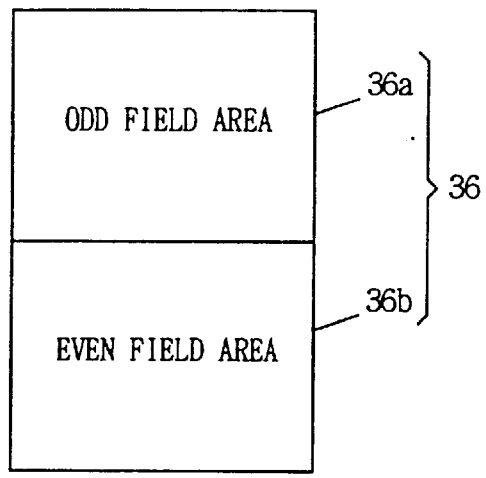
FIG. 5 illustrates storage areas of a bank #3 shown in FIG. 1.
Figure 6A:
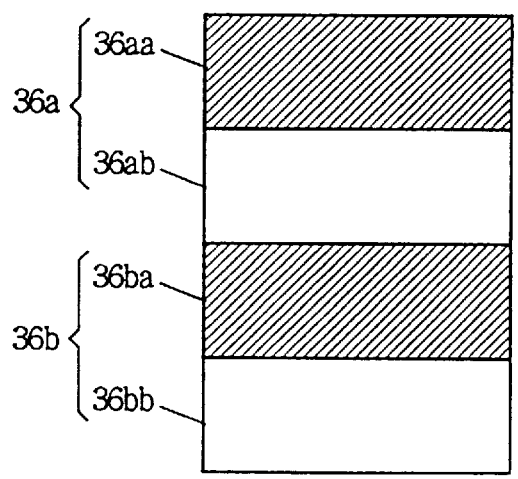
FIGS. 6A and 6B illustrate areas for writing and reading pixel data in a memory device shown in FIG. 5 respectively.

FIG. 5 schematically illustrates storage areas of the bank #3 shown in FIG. 1. Referring to FIG. 5, the bank #3 (36) includes an odd field area 36a storing odd field pixel data and an even field area 36b storing even field pixel data. Each of the odd and even field areas 36a and 36b may be divided into upper and lower half areas in the address space of the bank #3. Alternatively, the odd and even field areas 36a and 36b may be arranged on alternate rows (arrangement corresponding to the odd and even pixel lines). In the case of the frame structure, the encoded pixel data include both of odd and even field pixel data. As shown in FIG. 6A, therefore, the odd field pixel data are stored in an upper half area 36aa of the odd field area 36a while the even field pixel data are stored in an upper half area 36ba of the even field area 36b in a first field period of one frame period which in turn is formed by two field periods.

Figure 6B:
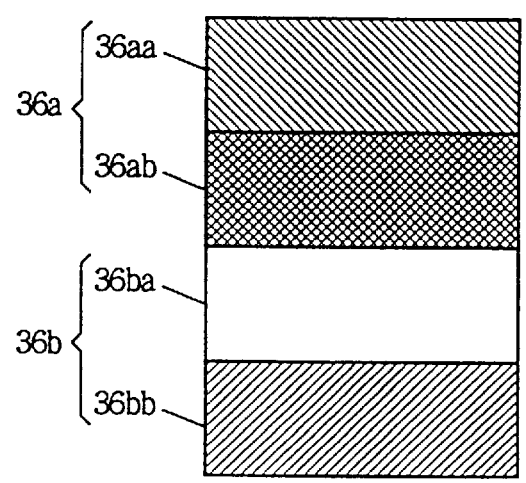

In the next field period, decoded pixel data are stored in lower half areas 36ab and 36bb of the odd and even field areas 36a and 36b, as shown in FIG. 6B. At this time, the pixel data are read from the odd field area 36a and displayed. The pixel data are read from the odd field area 36a every pixel line of the odd field successively in synchronization with the horizontal synchronizing signal HSYNC. In the lower half area 36ab of the odd field area 36a, on the other hand, pixel data of one pixel line are stored equivalently in two horizontal scanning periods (one horizontal scanning period is a time required for displaying all pixel data of one pixel line).

FIGS. 7A and 7B illustrate written and displayed pixel lines in display of pixel data of an odd field respectively. Referring to FIGS. 7A and 7B, it is assumed that each of odd and even fields has L pixel lines. It is also assumed that the pixel data are written in the memory device along the raster scan order.

When pixel data of the last pixel line L of the odd field area 36a are stored, pixel data of a pixel line L-1 which is precedent by one pixel line are read from this odd field area 36a and displayed on the display unit 22, as shown in FIG. 7A. In this state, therefore, the pixel data of the pixel line L-1 displayed on the display unit 22 have already been decoded, and correct display is carried out. The display speed is identical to the decoding speed. When the pixel data of the pixel line L-1 are completely displayed on the display unit 22, therefore, all pixel data of the last pixel line L are stored in the odd field area 36a.

In a next pixel line display period, restored pixel data of the last pixel line L are written in the even field area 36b in the bank #3 (36). At this time, the pixel data of the last pixel line L of the odd field area 36a are read and displayed on the display unit 22. When the pixel data of the last pixel line L are written in the even field area 36b, the pixel data of the last pixel line L stored in the odd field area 36a have already been completely decoded. Therefore, the decoded odd field pixel data of the last pixel line L are correctly displayed on the display unit 22.

In display of the even field pixel data, the pixel data can be correctly displayed since the even field area 36b already stores decoded pixel data.

Figure 8A:
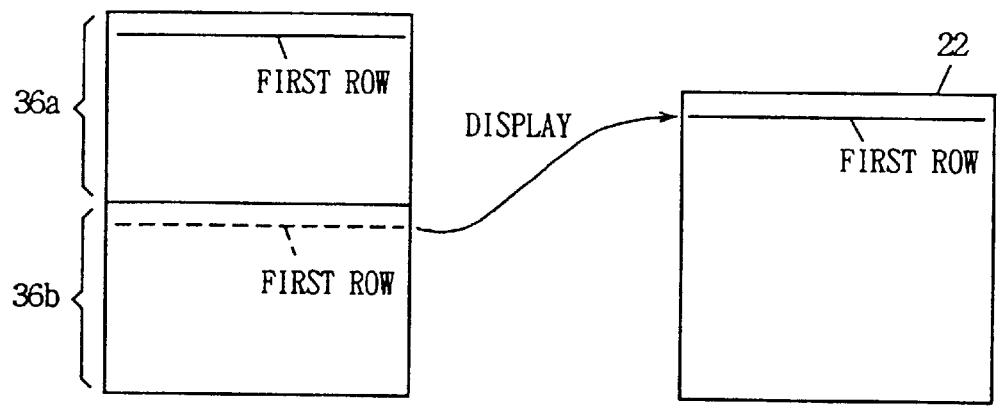
FIGS. 8A to 8C illustrate display and write fashions in a pixel line of an even field in the memory device shown in FIG. 5.
Figure 8B:
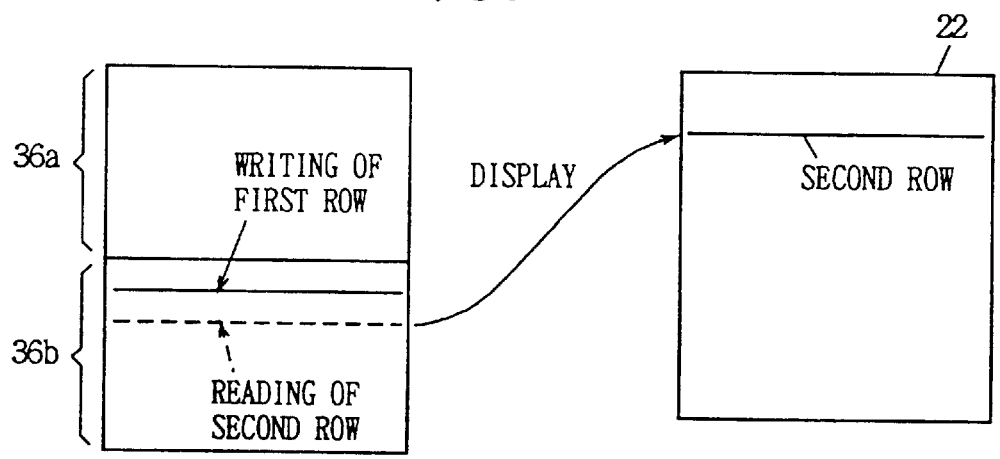

When the pixel data are written in and read from the even field area 36b (period T5), pixel data of the pixel line on the first row (line) of the odd field area 36a are decoded in display of the pixel data of the first row of the even field area 36b on the display unit 22, as shown in FIG. 8A. At this time, therefore, the display unit 22 correctly displays the pixel data of the first pixel line of the even field area. In a next pixel line display period, pixel data of the second row (second pixel line) of the even field area 36b are read and displayed on the display unit 22, as shown in FIG. 8B. At this time, the pixel data of the first row (first pixel line) of the even field area 36b are written (stored). Therefore, the pixel data of the pixel line of the second row can be correctly displayed on the display unit 22 with no substitution by the decoded pixel data.

Figure 8C:
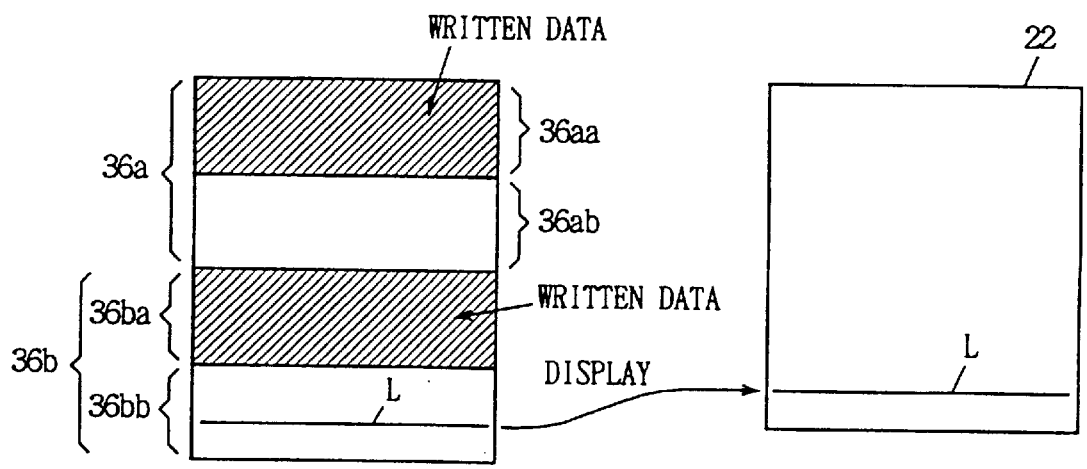

The data write speed for each pixel line of the even field area 36b is equivalently half the pixel line read speed. As shown in FIG. 8C, therefore, only pixel data of a next B frame are stored in the upper half area 36ba of the even field area 36b in display of the final pixel line L of the even field area. Therefore, the pixel data of the even field area can be correctly displayed on the display unit 22 with no influence exerted by the decoded pixel data.

As clearly understood from the explanation of the operations with reference to FIGS. 6A to 8C, it is also possible to cope with a case where three or more B frames are inserted between I and P frames or between P frames, the bank #3 having the storage capacity for pixel data of only one frame so far as the time difference between the decoding start timing and display start timing for each B frame is one field period. Since the number of successively supplied B frames is previously set in the sequence header region, the memory interface unit 16 designates which bank of the memory device 12 to be accessed by generating necessary address information in accordance with information on the B frame cycle (the number of successively supplied B frames) which is detected by the decoding unit 10.

Figure 9:
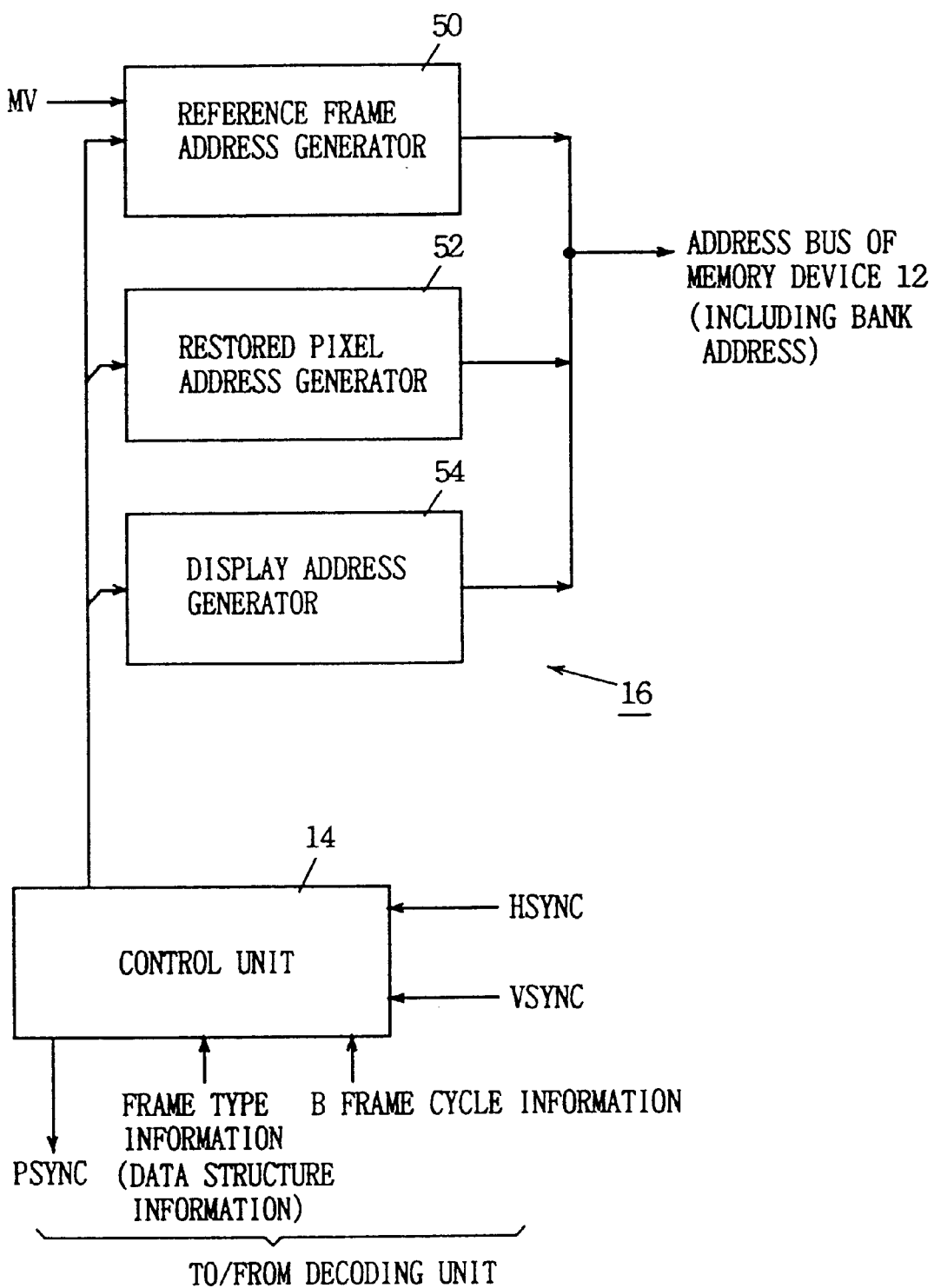
FIG. 9 schematically illustrates the structure of a memory interface unit shown in FIG. 1.

FIG. 9 schematically illustrates the structure of the memory interface unit shown in FIG. 1. Referring to FIG. 9, the memory device 12 is formed by a general dynamic random access memory, for example. As shown in FIG. 9, the memory interface unit 16 includes a reference frame address generator 50 which receives motion vector information MV from the decoding unit 10 shown in FIG. 1 and generates addresses for reading pixel data of reference (prediction) frames (macro blocks) under control by the control unit 14, a restored pixel address generator 52 which generates addresses for writing decoded pixel data (restored pixels) under control by the control unit 14, and a display address generator 54 which generates addresses for reading the pixel data for display on the display unit under control by the control unit 14. The control unit 14 receives the horizontal and vertical synchronizing signals HSYNC and VSYNC which are supplied from the display control unit shown in FIG. 1, and supplies the decoding unit 10 with the picture synchronizing signal PSYNC defining the frame period and deciding the pixel decoding start timing.

The control unit 14 supplies the address generators 50, 52 and 54 with information of the bank to be activated in accordance with frame type information and B frame information which are supplied from the decoding unit 10, while bringing these address generators 50, 52 and 54 into active states in a prescribed sequence. The frame type information (data structure information) indicates whether decoded frames are I or P frames or B frames. The B frame cycle information indicates the number of successively supplied B frames. The reference frame address generator 50 generates addresses only for the banks #1 and #2 (32 and 34: see FIG. 1). The address generator 52 and the display address generator 54 generate addresses for the banks #1 to #3 (32, 34 and 36). The addresses which are generated from these address generators 50, 52 and 54 are supplied to an address bus of the memory device 12. This address bus also transmits bank addresses for specifying the banks included in the memory device 12.

The reference frame address generator 50 generates no reference frame address when the frame type information from the control unit 14 indicates I frames. When P frames are decoded, the reference frame address generator 50 decides read addresses for the bank #1 (32) or #2 (34) in consideration of motion vectors MB and transmits the decided read addresses onto the address bus of the memory device 12. The restored pixel address generator 52 alternately selects the banks #1 and #2 in units of frames and supplies write addresses when restored pixel data are those of I or P frames. If the restored pixel data are those of B frames, on the other hand, the restored pixel address generator 52 supplies write addressees for the bank #3 (36).

The display address generator 54 selectively generates read addresses for the banks #1 to #3 (32, 34 and 36) in accordance with the B frame cycle information and/or the frame type information, under control by the control unit 14. The display address generator 54 activates each bank and supplies addresses for reading pixel data at a timing which is delayed by one field time from that starting decoding of the pixel data in synchronization with the picture synchronizing signal PSYNC.

The control unit 14 has an arbitration function of adjusting address generation timings of the address generators 50, 52 and 54 for preventing the addresses thereof from confliction on the address bus. Alternatively, an arbiter for avoiding access confliction on the memory device 12 may be separately provided.

According to the structure of the first embodiment of the present invention, as hereinabove described, the pixel data of each B frame are read and displayed with a delay of substantially one field time to the start timing for decoding the pixel data, whereby the bank for storing the B frames can be effectively utilized so that its storage capacity can be reduced to that for storing pixel data of one frame.

Embodiment 2

Figure 10:
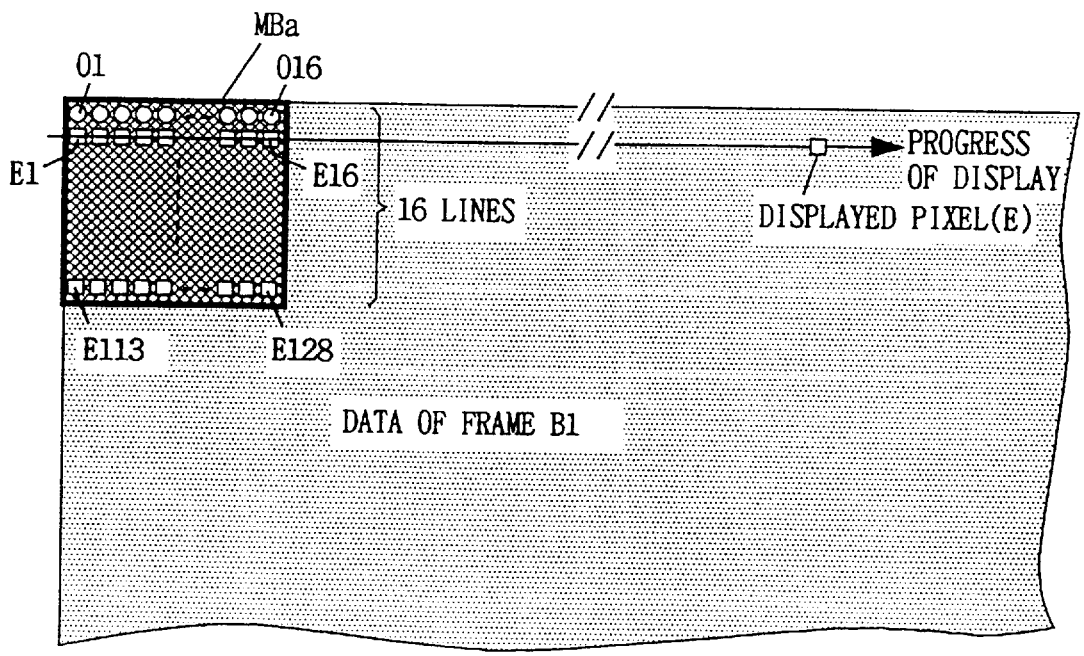
FIG. 10 illustrates an arrangement of decoded and displayed pixels of a frame-basis picture.

FIG. 10 illustrates the pixel data stored in the bank #3 which is included in the memory device shown in FIG. 1 in correspondence to arrangement on a display screen. In the state shown in FIG. 10, decoding and display operations are simultaneously started. FIG. 10 also shows storage contents in the case of storing decoded pixel data in units of macro blocks. FIG. 10 further shows a storage state of the pixel data in the bank #3 in the field period T5 shown in FIG. 4, for example. In this field period T5, display of even field pixel data (shown by squares in FIG. 10) of the B frame B1 which is stored in the bank #3 (36) and writing of pixel data of the next B frame B2 are carried out. Encoding processing is executed in units of macro blocks (blocks). In the aforementioned embodiment 1, the restored pixel data are written in the memory device in the raster scan order. The decoding processing is also executed in units of (macro) blocks, in correspondence to the encoding processing. Further, the restored pixel data are stored in the memory device also in units of macro blocks. The speed of progress of the decoding processing for the pixel data is substantially identical to the pixel data display speed. When decoding and display are simultaneously carried out, the following problem will be caused in the frame structure picture data in this case:

When decoding of one macro block MBa (16×16=256 pixels) is completed, the 256th pixel (E) of the even field of the B frame B1 is displayed. In resolution of the current television of the NTSC system, 720 pixels are arranged in the horizontal direction. In completion of the decoding of the macro block MBa in the field period T4, therefore, the displayed pixel (E) is present on the first pixel line of the even field of the B frame B1. On the other hand, the macro block MBa is formed by frame structure encoded pixel data, and includes pixel data of both of odd and even fields. In this state, therefore, pixel data of even fields of the B frame B1 which are not yet displayed are rewritten by the pixel data of the macro block MBa of the next B frame B2. Namely, pixel data E17 to E128 in the even field which is included in the macro block MBa replace pixel data of the B frame B1 which are not yet displayed in FIG. 10. In the case of the frame structure, therefore, it is apprehended that the pixel data are not correctly read when the time difference between the decoding start timing and the display timing for the pixel data is correctly set at one field time.

Figure 11:
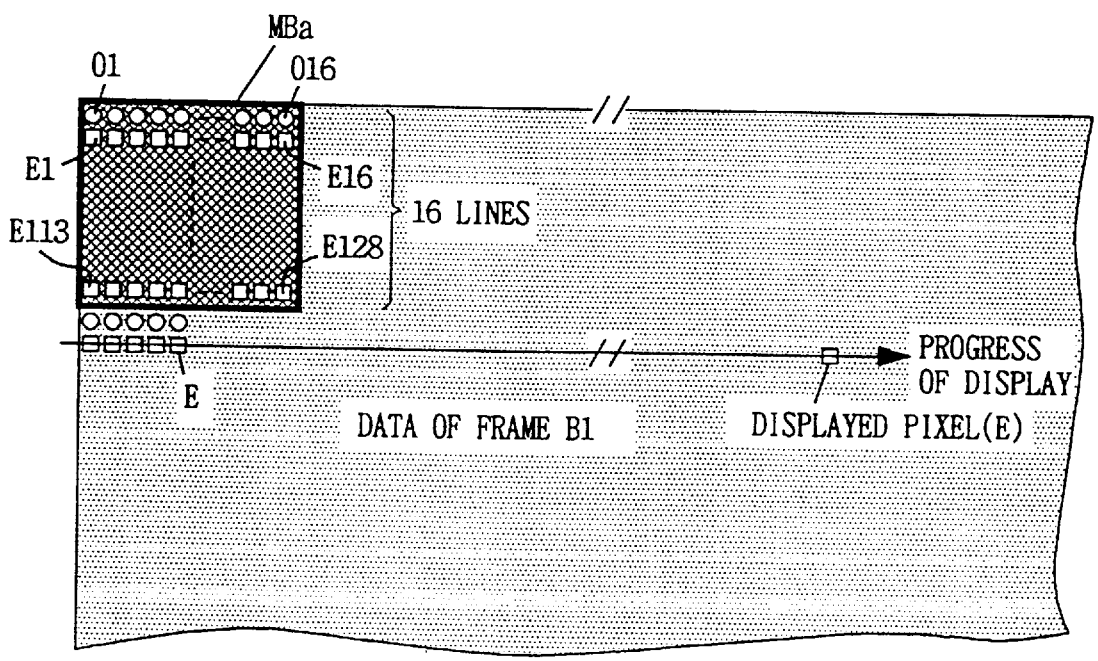
FIG. 11 illustrates arrangement of storage contents of a memory device in decoding and display of pixel data in a second embodiment of the present invention.

FIG. 11 illustrates a state of stored pixel data in a bank #3 in a field period T4 in a picture decoding/display unit according to a second embodiment of the present invention. As shown in FIG. 11, a decoding start timing for encoded pixel data is so set that decoding of the encoded pixel data is started after display of one macro block line (a set of pixels included in a horizontally arranged macro block line) is completed according to the second embodiment of the present invention. Due to the delay of the decoding start timing for the encoded pixel data shown in FIG. 11, only already displayed pixel data are substituted by pixel data of a new macro block MBa. Thus, correct display of pixel data can be carried out.

Figure 12:
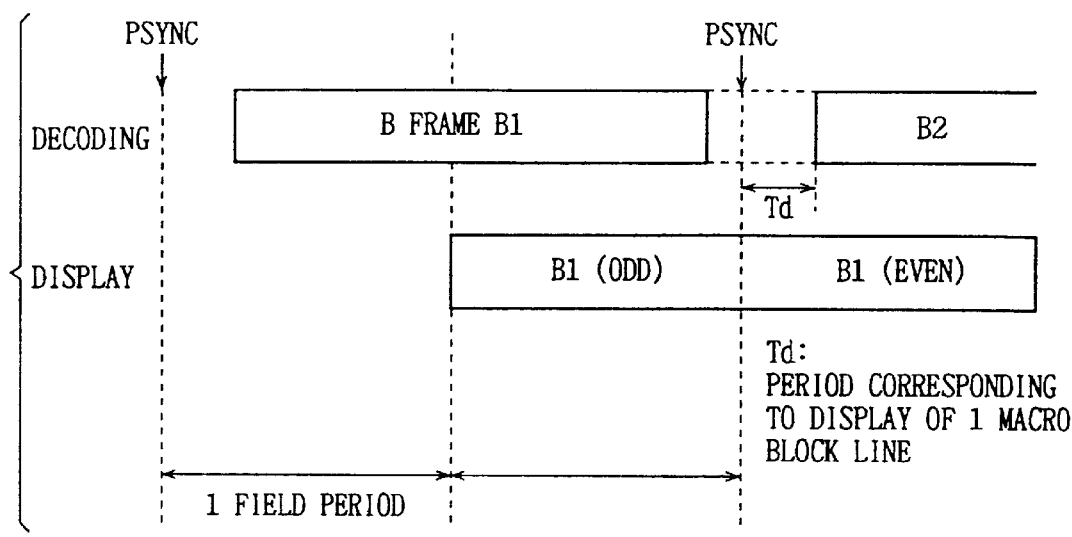
FIG. 12 illustrates the relation between decoding start and display start timings in the second embodiment of the present invention.

FIG. 12 schematically illustrates the relation between this B frame decoding start timing and a B frame display start timing. Referring to FIG. 12, the frame decoding start timing is delayed by a period Td corresponding to a display period for pixel data of one macro block line with respect to the assertion of picture synchronizing signal PSYNC defining a frame period. Referring to FIG. 12, a decoding completion time for a B frame B1 may conceivably be prolonged into a next frame period when the display speed and the decoding speed for each B frame are identical to each other. In general, however, decoding processing of pixel data of each frame is completed within a period which is shorter than one field period, as shown in the sequence of FIG. 3, for example. This is because there is a period which is required for analyzing header information etc. and a time for refreshing of data in the memory device is required when a memory device is formed by a DRAM. Therefore, the decoding operation for the B frame B1 is completed in the frame period even if the decoding start timing for the B frame is delayed, as shown in FIG. 12. Pixel data of one frame are decoded and written in one frame period, while the pixel data of this frame are read and displayed in a period which is defined by one frame. This state is referred to as the decoding speed being equal to the display speed.

Figure 13:
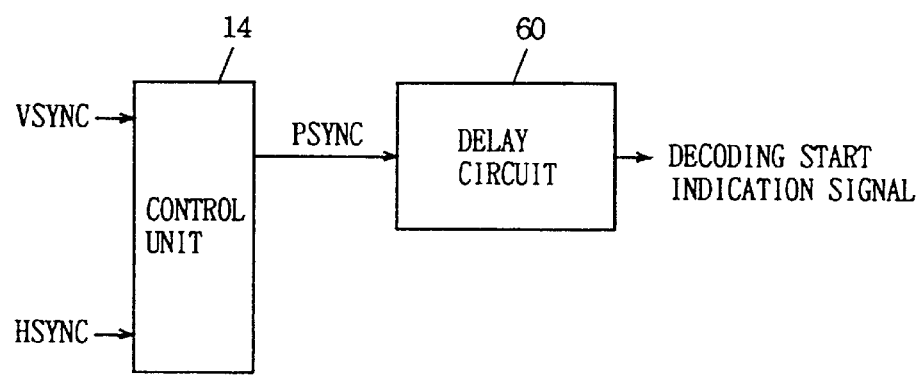
FIG. 13 illustrates an exemplary circuit structure for implementing a delay time shown in FIG. 12.

FIG. 13 schematically illustrates a structure for implementing the timing relation shown in FIG. 13. In the structure shown in FIG. 13, a delay circuit 60 is provided for delaying the picture synchronizing signal PSYNC which is outputted from a control unit 14 by a period corresponding to a period for displaying pixel data of one macro block line. This delay circuit 60 supplies a decoding start indication signal corresponding to the picture synchronizing signal PSYNC shown in FIG. 1 to a decoding unit 10. The control unit 14 outputs the picture synchronizing signal PSYNC in synchronization with vertical and horizontal synchronizing signals VSYNC and HSYNC from a display control unit (see FIG. 1). In display, it is generally difficult to change the timing for outputting each displaying pixel data, since the output timing for the displaying pixel data is generally decided in accordance with the vertical and horizontal synchronizing signals VSYNC and HSYNC which are outputted from the externally provided display control unit. Due to provision of the delay circuit 60, it is possible to readily delay the period for starting decoding of each frame by the delay time Td. The starting of decoding may be delayed only with respect to a frame having a possibility of the substitution of stored pixel data.

Figure 14:
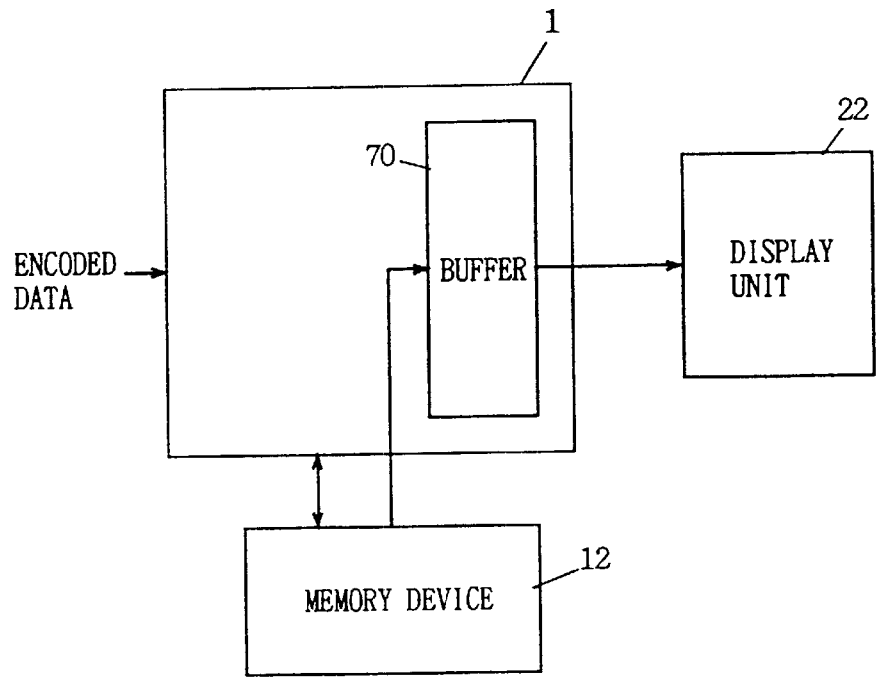
FIG. 14 illustrates another structure for implementing the timing relation shown in FIG. 12.

FIG. 14 illustrates another structure of the second embodiment of the present invention. In the structure shown in FIG. 14, a buffer 70 is arranged between a data output part of memory device 12 and display unit 22 (output port). This buffer 70 may alternatively be included in the display interface 18 shown in FIG. 1. The buffer 70 which is formed by a memory, for example, stores pixel data of one macro block line, when the buffer to have the storage pixel data inputted/outputted at the display speed of the display unit 22. The buffer 70, which has the structure of a first-in first-out memory, successively outputs pixel data to the display unit 22 in the stored order.

Figure 15:
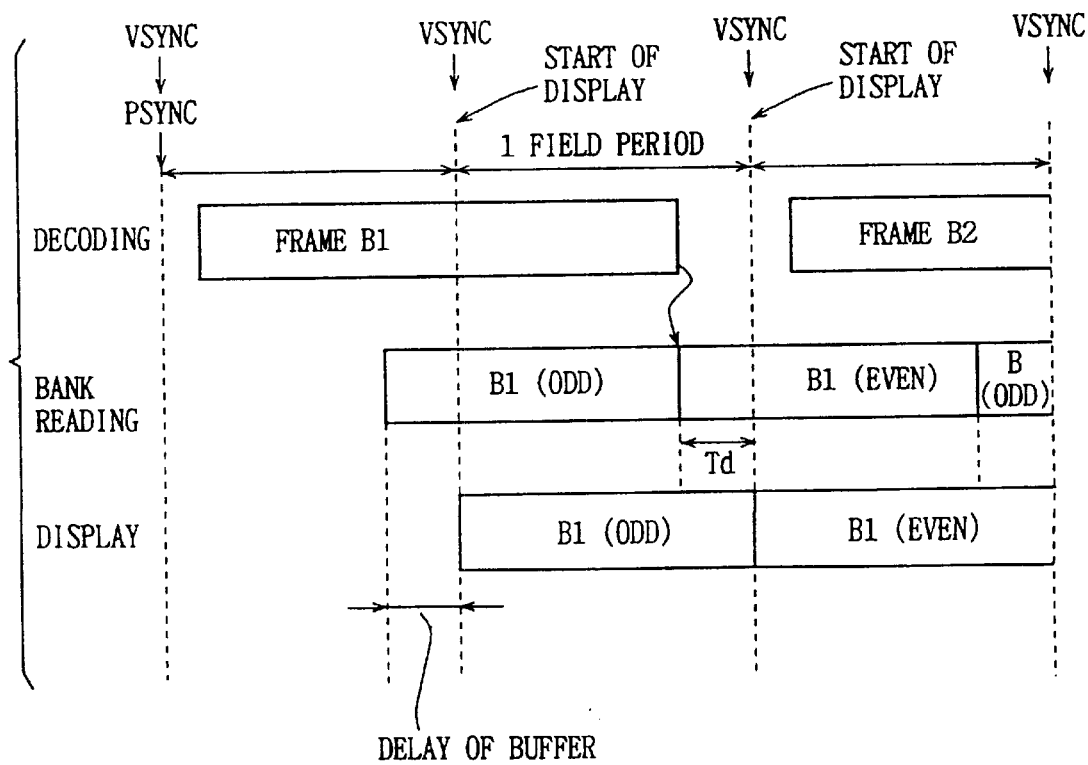
FIG. 15 illustrates operation timings of the circuit structure shown in FIG. 14.

FIG. 15 illustrates frames which are displayed on the display unit 22 of the structure shown in FIG. 14 and output timings for pixel data which are read from the memory device 12 and for data of the buffer 70. Pixel data which are outputted from the buffer 70 are identical in sequence of arrangement to pixels displayed on the display unit 22. The timing for outputting the pixel data from the buffer 70 is decided by vertical and horizontal synchronizing signals VSYNC and HSYNC which are supplied from a display control unit (not shown in FIG. 14). Decoding of pixel data of a B frame is started in synchronization with picture synchronizing signal PSYNC. After a lapse of one field period from assertion of the picture synchronizing signal PSYNC, pixel data of odd and even fields of the B frame are successively read from the buffer 70 in units of fields. In order to output the pixel data from the buffer 70 in synchronization with this display starting, the pixel data are read from the memory device 12 at a timing which is earlier by a delay time of the buffer with respect to the display starting (or the completion of decoding of the field), so that the read pixel data are stored (prefetched) in the buffer 70. Thus, the timing for reading the pixel data from the memory device 12 is made earlier by the delay time at the buffer 70, and this equivalently corresponds to delay of the timing for starting decoding of the B frame, as shown by Td in FIG. 15. Thus, it is possible to implement an effect which is similar to that in the case of employing the delay circuit 60 shown in FIG. 13.

The structure of providing the buffer 70 between the memory device 12 and the display unit 22 shown in FIG. 14 may be combined with the structure of delaying the picture synchronizing signal PSYNC by the delay circuit 60 shown in FIG. 13. When the delay circuit 60 is combined with the buffer 70, the storage capacity of the buffer 70 can be reduced.

The buffer 70 may alternatively be provided on a path for reading restored pixel data from decoding unit 10 to the memory device 12, so that writing of restored picture data is delayed only with respect to a B frame having a possibility of data substitution in the memory device 12. Further, such a B frame having a possibility of data substitution may be passed through such a buffer memory, which in turn is shorted or by-passed for a B frame (head B frame) having no such possibility.

According to each structure of the second embodiment of the present invention, as hereinabove described, a timing for starting decoding of a frame is further delayed as compared with one field period by a display period for pixel data of one macro block line, whereby it is possible to correctly display pixel data while preventing substitution of the pixel data regardless whether the field of the B frame is an even or odd field.

Embodiment 3

In the current television of the NTSC system, 60 fields (=30 frames) are displayed per second. On the other hand, the display speed for a cinefilm is 24 frames/sec. In order to display a movie on a TV screen, therefore, it is necessary to convert the frame number per second (frame rate). In general, the frame rate is converted by a 3:2 pulldown conversion method.

Figure 16:
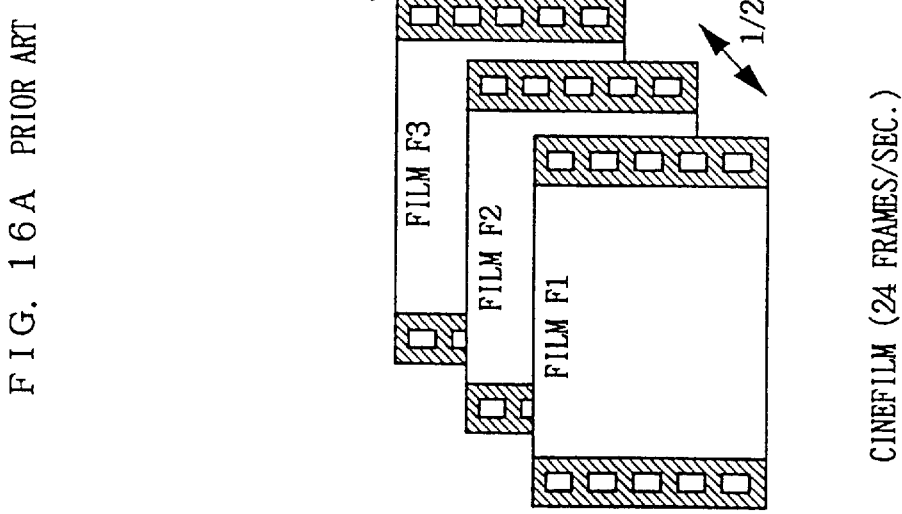
FIGS. 16A and 16B illustrate a 3:2 pulldown conversion technique.

FIGS. 16A and 16B illustrate a generally employed technique of frame rate conversion in accordance with the 3:2 pulldown conversion method. As shown in FIG. 16A, successive cinefilms F1, F2, F3 . . . have a cycle of 1/24 sec. The cinefilms F1, F2, F3 . . . are made to alternately correspond to two fields, three fields and two fields of TV display pictures, as shown in FIG. 16B. Namely, the frame picture of the cinefilm F1 is displayed for two field times (one field time=1/60 sec.), that of the cinefilm F2 is displayed for three field times, and that of the cinefilm F3 is displayed for two field times. Respective frames of the cinefilms are made to alternately correspond to two fields and three fields of the TV pictures. Thus, two frames of the cinefilms correspond to five fields of the TV pictures, whereby 24 frames of the cinefilms correspond to 60 fields of the TV pictures, thereby implementing conversion at a desired frame rate.

Figure 17:
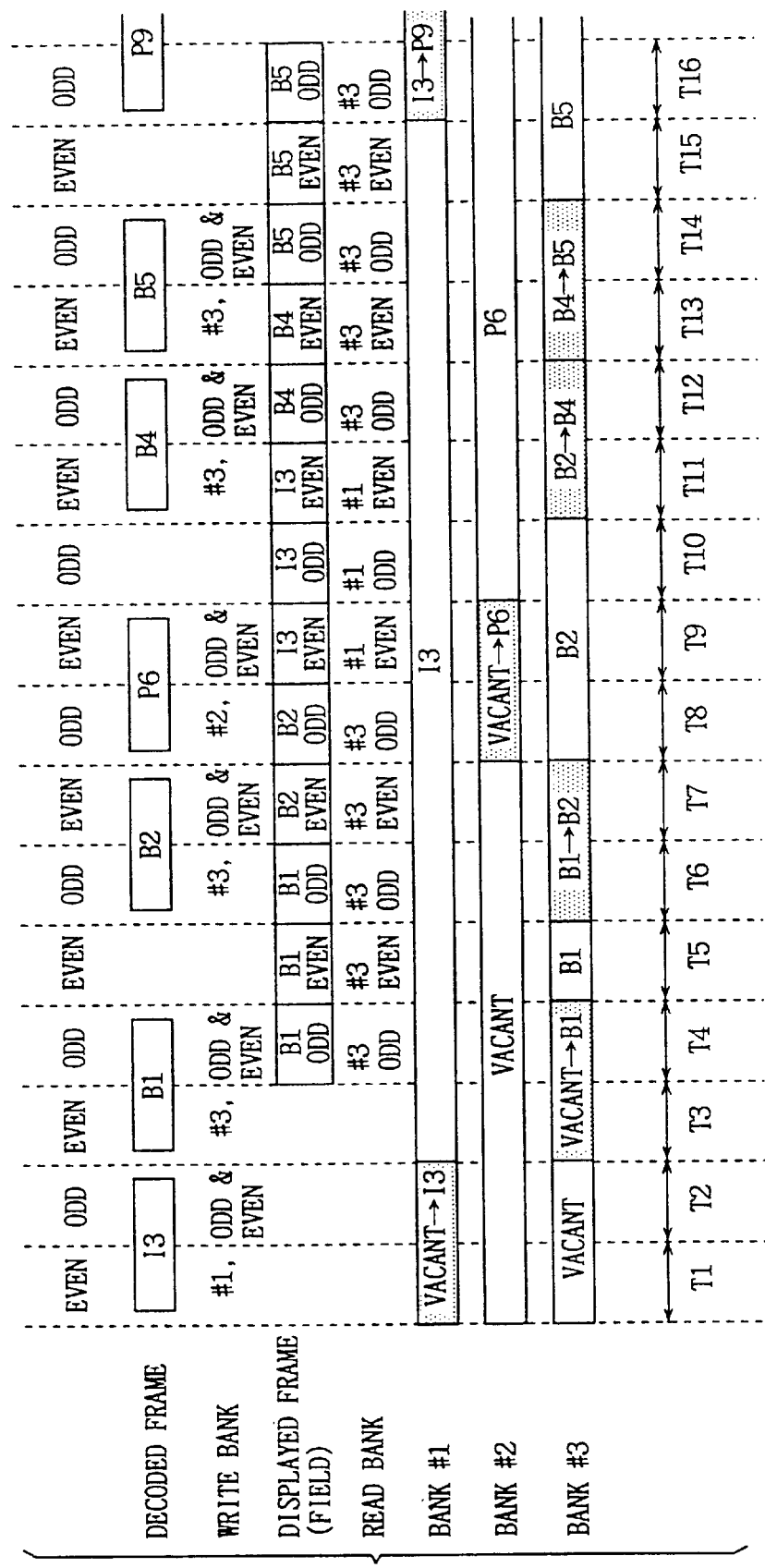
FIG. 17 illustrates an operation sequence of a picture decoding/display unit according to a third embodiment of the present invention.

FIG. 17 illustrates an operation sequence for implementing a 3:2 pulldown conversion function in a picture decoding/display unit according to a third embodiment of the present invention. Frames shown in FIG. 17 are decoded and displayed in the same order as that shown with reference to the aforementioned first embodiment. In the operation sequence shown in FIG. 17, decoding of a next frame is started in synchronization with display of a field to be finally displayed in a certain frame. When pixel data of a field to be finally displayed of a certain frame are read at least twice, the frame decoding operation is stopped by one field period which is precedent thereto. Overwriting of the pixel data is prevented in bank #3 (see FIG. 1) for storing B frames, by stopping the decoding operation by one field period. The frame rate conversion operation is now described with reference to FIG. 17.

In field periods T1 and T2, an I frame I3 is decoded so that the decoded pixel data are written in bank #1.

In field periods T3 and T4, a B frame B1 is decoded so that decoded pixel data are written in the bank #3. In a next field period T5, an even field of the B frame B1 is read and displayed. This B frame B1 is a frame which is displayed for three field periods, and pixel data of an odd field of the B frame B1 are again read from the bank #3 and displayed in a period T6. This odd field of the B frame B1 is a field to be finally displayed, and subjected to the second time display. Therefore, no decoding processing is executed in the field period T5 which is precedent to the second time display. Due to such stoppage of the decoding processing in the field period T5, overwriting by a next B frame B2 in the bank #3 is prevented.

Decoding of the next frame, i.e., the B frame B2, is started in synchronization with starting of the display of the field to be finally displayed, i.e., the odd field, of the B frame B1 in the period T6. At this time, all pixel data of the odd field of the B frame B1 are decoded ones, which can be correctly read and displayed with no influence exerted by writing of the pixel data of the B frame B2 in the bank #3 since the read speed is faster than the write speed with respect to a pixel line in an odd field area (see the field period T5 in FIG. 4). When picture data are decoded and written in units of blocks (macro blocks), any one of the aforementioned structures of providing delays shown in FIGS. 11 to 15 may be employed, in order to reliably prevent overwriting.

The B frame B2 is displayed for two field periods. Therefore, the pixel data of an even field of the B frame B2 are read and displayed from a field period T7, while pixel data of its odd field are displayed in a field period T8. The field of the B frame B2 to be displayed is the final field in the filed period T8, and hence decoding of a next frame, i.e., a P frame P6, is executed in the field period T8.

In a field period T9, the already decoded I frame I3 is displayed for three field periods in accordance with the display order. Also in the display of the I frame I3, the decoding processing is stopped for one field period T10 which is precedent to a display period T11 for the finally displayed field, i.e., the even field of the I frame I3. When the even field of the I frame I3 is read and displayed in the period T11, decoding of a next B frame B4 is started in this field period T11. Namely, pixel data of odd and even fields of the B frame B4 are successively read and displayed in field periods T12 and T13 respectively. A next B frame B5 is a frame which is displayed for three field periods, and pixel data thereof are successively read and displayed in the order of odd, even and odd fields in field periods T14 to T16 respectively. No decoding processing is carried out in the field period T15.

It is possible to ensure a display period of a further one extra field period, equivalently equalize the decoding processing speed and the display speed with each other, and decode and display pictures while carrying out correct frame rate conversion by stopping the decoding processing for one field period every four fields (every two frames). The odd and even fields alternately appear in the displayed frames. Thus, no even or odd fields are continuously displayed, and deterioration of the picture quality is prevented. As to each B frame, decoding and display are started with time difference of one field period, whereby the picture data can be stored and displayed through the bank #3 having a storage capacity for one frame while preventing overwriting, similarly to the embodiments 1 and 2.

Figure 18:
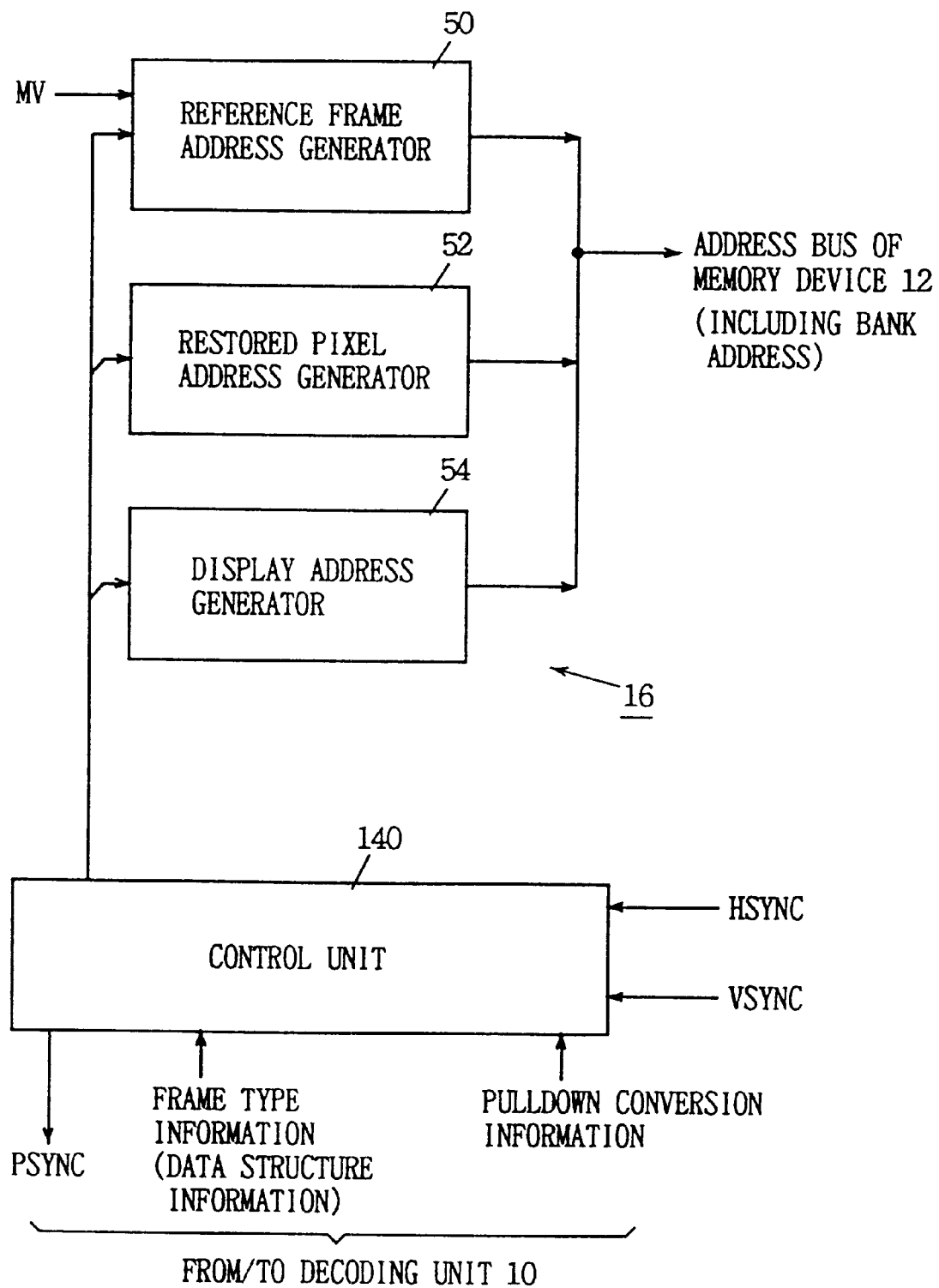
FIG. 18 schematically illustrates the structures of a memory interface unit and a control unit employed in the third embodiment of the present invention.

FIG. 18 schematically illustrates the structure of a control part of the picture decoding/display unit according to the third embodiment. In the structure of the control part shown in FIG. 18, a control unit 140 receives pulldown conversion information which is supplied from decoding unit 10, in addition to the aforementioned structure of FIG. 9. The pulldown conversion information is stored in a frame (picture) header region, for example, and the decoding unit 10 analyzes the frame (picture) header and supplies extracted pulldown conversion information to the control unit 140. This pulldown conversion information designates the display period (two or three fields) for the corresponding frame (picture). In accordance with frame type information (data structure information) and the pulldown conversion information which are supplied from the decoding unit 10, the control unit 140 controls operations of a reference frame address generator 50 generating addresses of reference pixels of reference frames, a restored pixel address generator 52 generating storage (write) addresses of restored pixels, and a display address generator 154 generating addresses of displayed pixels.

The reference frame address generator 50 and the restored pixel address generator 52 are identical in structure to those shown in FIG. 9. The display address generator 154 generates the addresses under control by the control unit 140, so that the same bank is accessed during three fields, two fields, three fields, . . . At this time, the display address generator 154 converts the display addresses such that pixel data of odd and even fields are alternately read through the field periods. This address conversion function may be so implemented that the control unit 140 supplies field specifying addresses to the display address generator 154 in accordance with the pulldown conversion information. The operation of each of the reference frame address generator 50 and the restored pixel address generator 52 is stopped for one field every four fields, since no decoding processing operation is carried out in this field period.

In the above description, the pulldown conversion information is included in the frame (picture) header and extracted for pulldown conversion. Alternatively, the user may fixedly set the pulldown conversion information in the unit, or the pulldown conversion information may be supplied from an external unit (not shown).

In the structure according to the third embodiment of the present invention, as hereinabove described, decoding of a next frame is started in synchronization with display starting of pixel data of a field, to be finally displayed, of a certain frame on the basis of an operation of staggering the decoding starting and the display starting of pixel data of a B frame by one field period, whereby pulldown conversion such as 3:2 pulldown conversion can be readily implemented without increasing the storage capacity of a bank for storing B frames.

Embodiment 4

Figure 19:
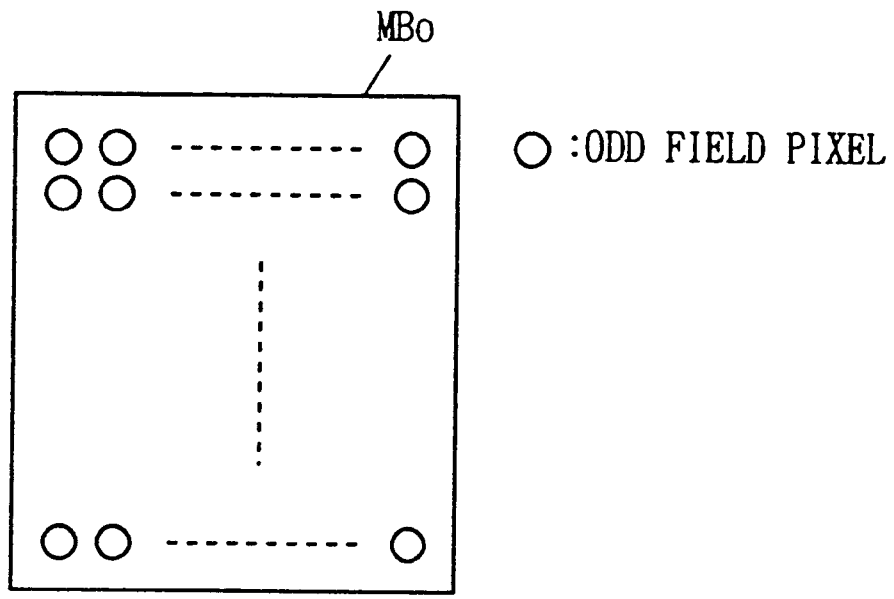
FIG. 19 illustrates the structure of a field predictive system macro block in a fourth embodiment of the present invention.
Figure 20:
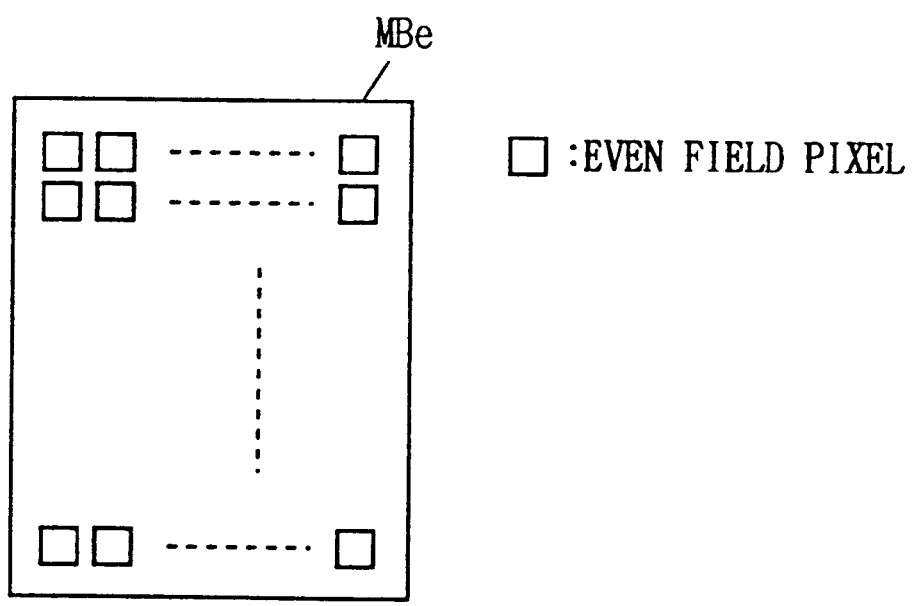
FIG. 20 illustrates the structure of a picture (macro block) in the units of fields employed in the fourth embodiment of the present invention.

FIGS. 19 and 20 illustrate macro blocks of encoded pixel data having a field structure. FIG. 19 shows a macro block MBo which is formed by pixels (shown by white circles) of an odd field, and FIG. 20 shows a macro block MBe which is formed by pixels (shown by squares) of an even field. In the field structure, the odd field is formed by only the macro blocks MBo, and the even field is formed by only the macro blocks MBe. In the case of such field structure picture data, only the pixel data of the odd and even fields are transmitted and decoded in field periods respectively, dissimilarly to the aforementioned picture data of the frame structure.

Figure 21:
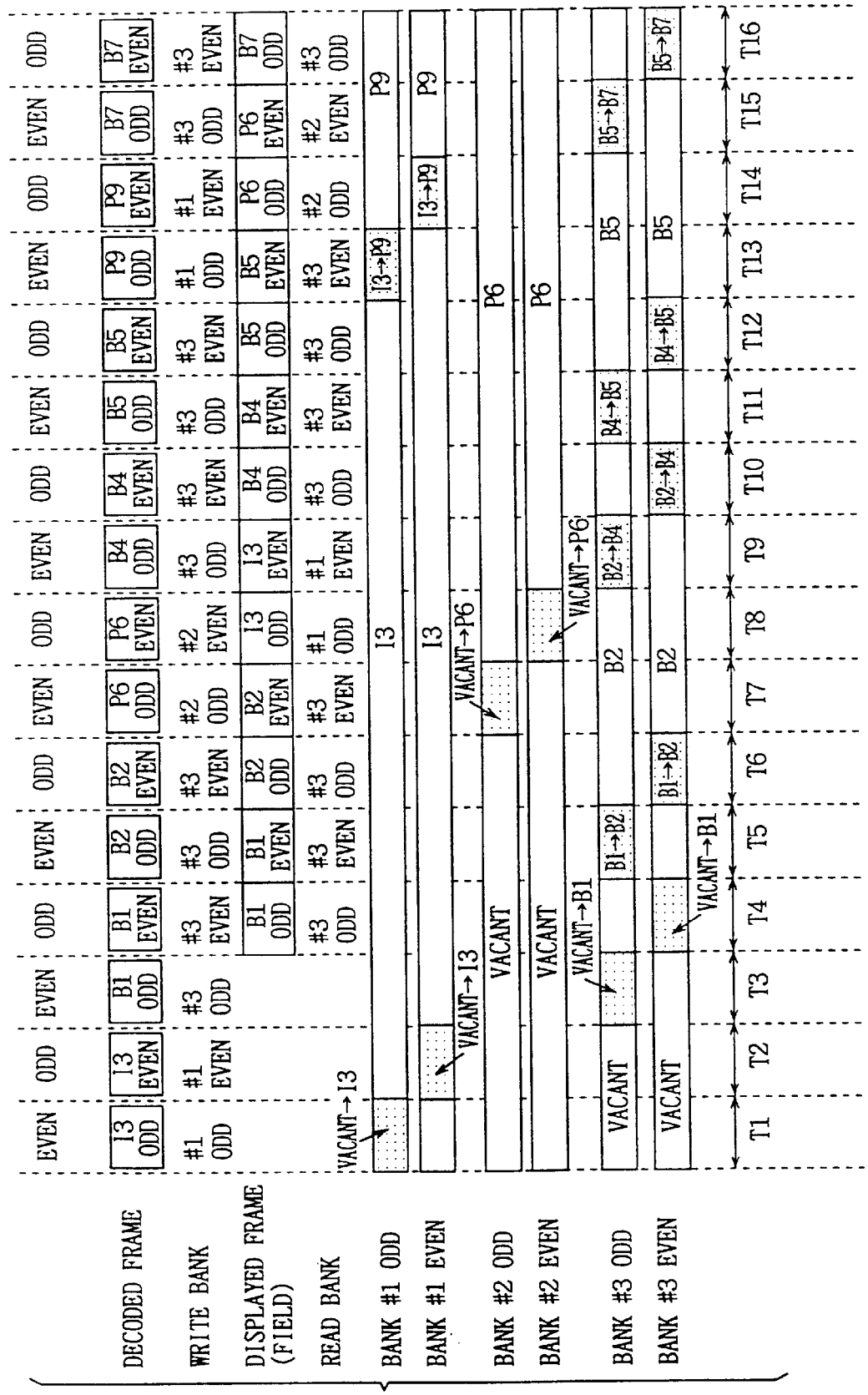
FIG. 21 illustrates an operation sequence of the picture decoding/display unit according to the fourth embodiment of the present invention.

FIG. 21 illustrates the operation of a picture decoding/display unit according to a fourth embodiment of the present invention. In an operation sequence diagram shown in FIG. 21, the orders of decoding and displaying of frames are identical to those in the first or second embodiment. In the case of picture data which are (predictively) encoded in the field structure, pixel data of odd and even fields are transmitted and decoded in different periods respectively, as shown in FIG. 21. Therefore, pixel data of one even or odd field are decoded in each field period. Also in such decoding, a bank for storing picture data of B frames may sufficiently have a storage capacity for storing pixel data of one frame, due to time difference between the starting of frame decoding and the starting of display by one field period in relation to the pixel data of the B frames.

Figure 22A:
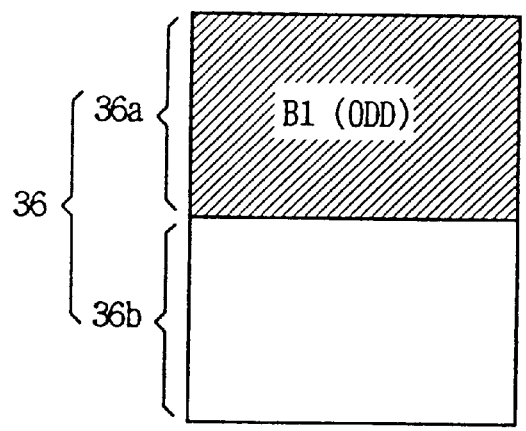
FIGS. 22A to 22C illustrate an access manner of B frame data in the fourth embodiment of the present invention.
Figure 22B:
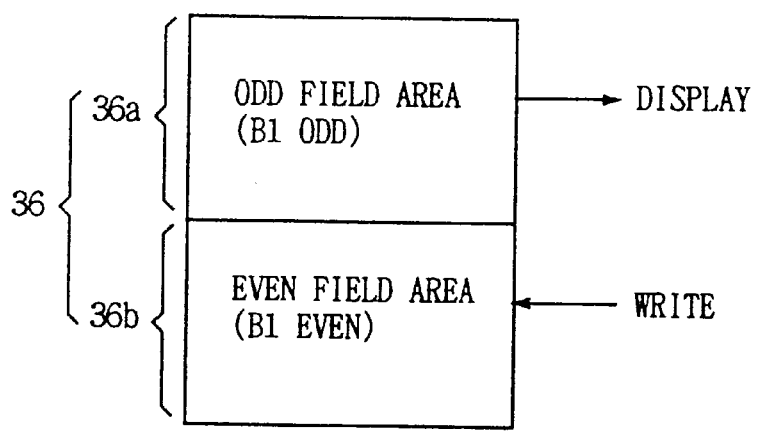

Namely, only odd field pixel data are decoded in a first field period for a B frame, and the pixel data are stored in the odd field area 36a of the bank #3 (36), as shown in FIG. 22A. In a next field period, the pixel data stored in the odd field area 36a are read and displayed as shown in FIG. 22B. On the other hand, pixel data are written in the even field area 36b which is absolutely different from the odd field area 36a. Thus, no substitution of the pixel data is caused in this period, and correct decoding and display operations can be guaranteed.

Figure 22C:
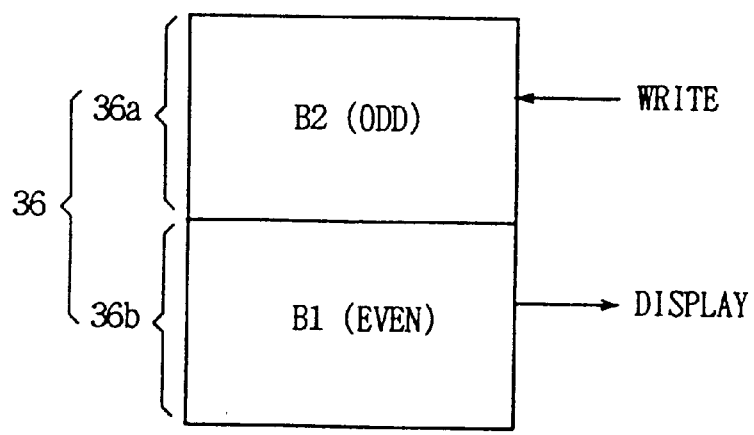

In a next field period, odd field pixel data of a next B frame (B2, for example) are written in the odd field area 36a as shown in FIG. 22C, while even field pixel data of a precedent B frame (B1, for example) written in the even field area 36b are read and displayed at this time. Also in this case, therefore, no substitution of the pixel data is caused and correct decoding and display can be carried out.

When the picture data are encoded in units of fields, areas for data writing and data reading are completely separated from each other in the bank #3 as shown in the fourth embodiment, and it is not necessary to provide a delay between a decoding start timing and a display start timing, dissimilarly the arrangements of FIGS. 11, 12 and 15. When picture data are encoded in a field predictive encoding system and decoded in units of fields, therefore, it is not necessary to provide the delay means as shown in FIG. 13 or 14.

Modification

Figure 23:
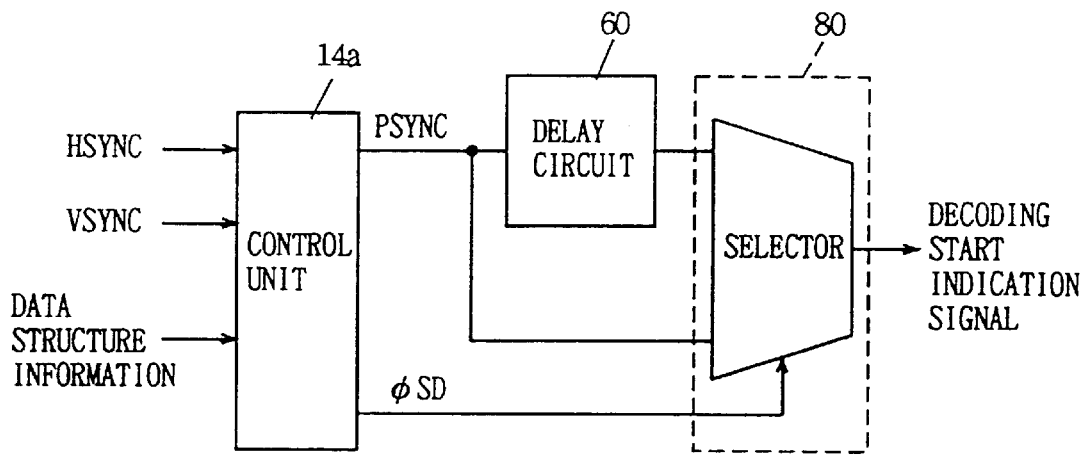
FIG. 23 illustrates the structure of a first modification of the fourth embodiment of the present invention.

FIG. 23 illustrates the structure of a modification of the fourth embodiment according to the present invention. Referring to FIG. 23, a delay circuit 60 for delaying a picture synchronizing signal PSYNC which is outputted from a control unit 14a by a prescribed time is provided on an output part of the control unit 14a with a switching circuit 80 for selectively invalidating the delay which is provided by the delay circuit 60. The delay circuit 60 shown in FIG. 23 is equivalent to the aforementioned delay circuit 60 shown in FIG. 13. The control unit 14a outputs the picture synchronizing signal PSYNC in accordance with horizontal and vertical synchronizing signals HSYNC and VSYNC which are supplied from a display control unit shown in FIG. 1.

The control unit 14a further receives data structure information (included in a sequence header, for example) which is supplied from a decoding unit (not shown), identifies whether pictures to be decoded are supplied in units of frames (frame structure pictures) or supplied in units of fields (field structure pictures), sets the logical level of a delay switching signal φSD in accordance with the result of the identification, and outputs the signal φSD.

The delay switching circuit 80 is formed by a selector which selectively passes one of the picture synchronizing signal PSYNC and an output signal of the delay circuit 60 in response to the signal φSD from the control unit 14a. The delay switching signal φSD, which is a binary signal, is set at a low logical level, for example, when the data structure information indicates the frame structure, so that the output signal of the delay circuit 60 is selected. Thus, the delay circuit 60 effectively functions so that the picture synchronizing signal PSYNC is delayed by a prescribed time and outputted as a decoding start indication signal. When the data structure information indicates the field structure, on the other hand, the signal φSD is set at a high logical level, for example, so that the output signal PSYNC from the control unit 14a is selected. In this state, the delay circuit 60 is effectively inactivated, so that its delay function is invalidated. The picture synchronizing signal PSYNC outputted from the control unit 14*a* is transmitted as a decoding start indication signal through selector 80.

When the structure shown in FIG. 23 is employed, it is possible to set the decoder/display unit into either a state of synchronizing a decoding start timing with a display start timing or a state of delaying the former with respect to the latter, under control by the control unit 14*a*. Therefore, it is possible to cope with both of field and frame structure pictures by a single unit, thereby implementing a picture decoding/display unit having high versatility.

The selector which is included in the delay switching circuit 80 simply implement the function of passing the signal, and hence it may have an arbitrary circuit structure. Namely, the selector may only have a structure of effectuating the delay provided by the delay circuit 60 for decoding and displaying frame structure pictures, while invalidating the delay for decoding and displaying field structure pictures.

Figure 24:
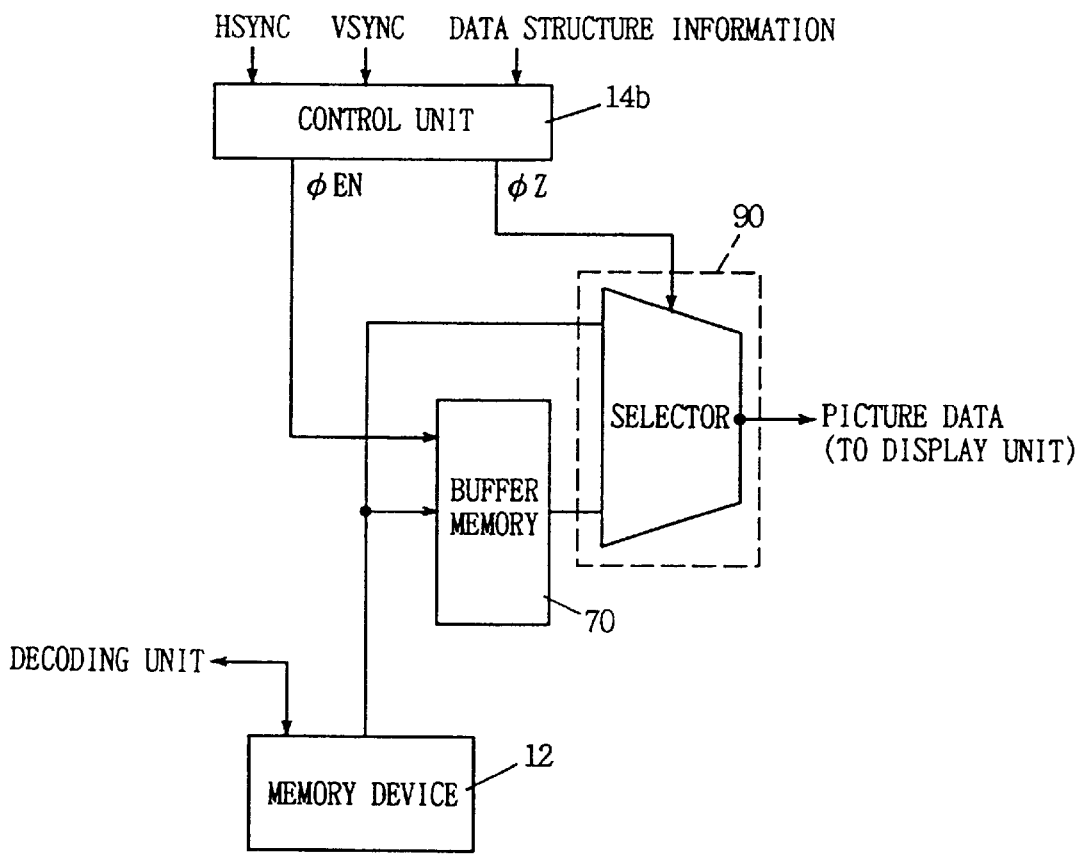
FIG. 24 illustrates the structure of a second modification of the fourth embodiment of the present invention.

FIG. 24 illustrates the structure of another modification of the fourth embodiment. In the structure shown in FIG. 24, a delay switching circuit 90 which is formed by a selector is provided at an output of a buffer memory 70, of a FIFO type for short-circuiting a signal propagation path (input/output part) of the buffer memory 70 in response to a control signal φZ from a control unit 14*b*. When data structure information indicates a frame structure and picture data are supplied in units of frames, the control unit 14*b* sets the control signal φZ at a low logical level, for example, to bring the delay switching circuit 90 into a state of selecting the pixel data outputted from the buffer memory 70 while activating an enable signal φEN for bringing the buffer memory 70 into an operating state. In this state, data which are read from memory device 12 are transmitted to a display unit after they are delayed by a prescribed time in the buffer memory 70. In this state, therefore, a decoding start timing is equivalently delayed by the delay time provided by the buffer memory 70.

When the data structure information indicates a field structure and the picture data are supplied in units of fields, on the other hand, the control unit 14*b* sets the control signal φZ at a high logical level, for example, to bring the delay switching circuit 90 into a state of selecting pixel data outputted from the memory device 12 while inactivating the enable signal φEN for bringing the buffer memory 70 into an inactive state. In this state, the pixel data which are read from the memory device 12 are transmitted to the display unit through the delay switching circuit 90. In this state, a start timing for displaying the pixel data on the display unit is synchronized with a decoding processing start timing in a decoding unit.

Also when the structure shown in FIG. 24 is employed, it is possible to set time difference between the decoding processing start timing and the pixel data display start timing in accordance with the processing units for the pictures.

Also according to the structure shown in FIG. 24, an arbitrary structure can be employed for the selector forming the delay switching circuit 90 so far as the structure invalidates the delay provided by the buffer memory 70 when the picture data are supplied in units of fields.

The selection path of the delay switching circuit shown in FIG. 23 or 24 may also be set either by the user at need or by a control signal from the exterior.

According to any structure of the fourth embodiment, as hereinabove described, the time difference between the decoding processing start timing and the pixel data display start timing is substantially set at one field time when the picture data are supplied in units of fields, whereby the timing for reading the data from the memory device can be readily set to simplify the control. Further, the delay provided by the delay means is selectively effectuated/invalidated in accordance with the type of the pictures (units of fields or frames), whereby it is possible to implement a picture decoding/display unit having high versatility which can cope with a plurality of picture types. Embodiment 5

Figure 25:
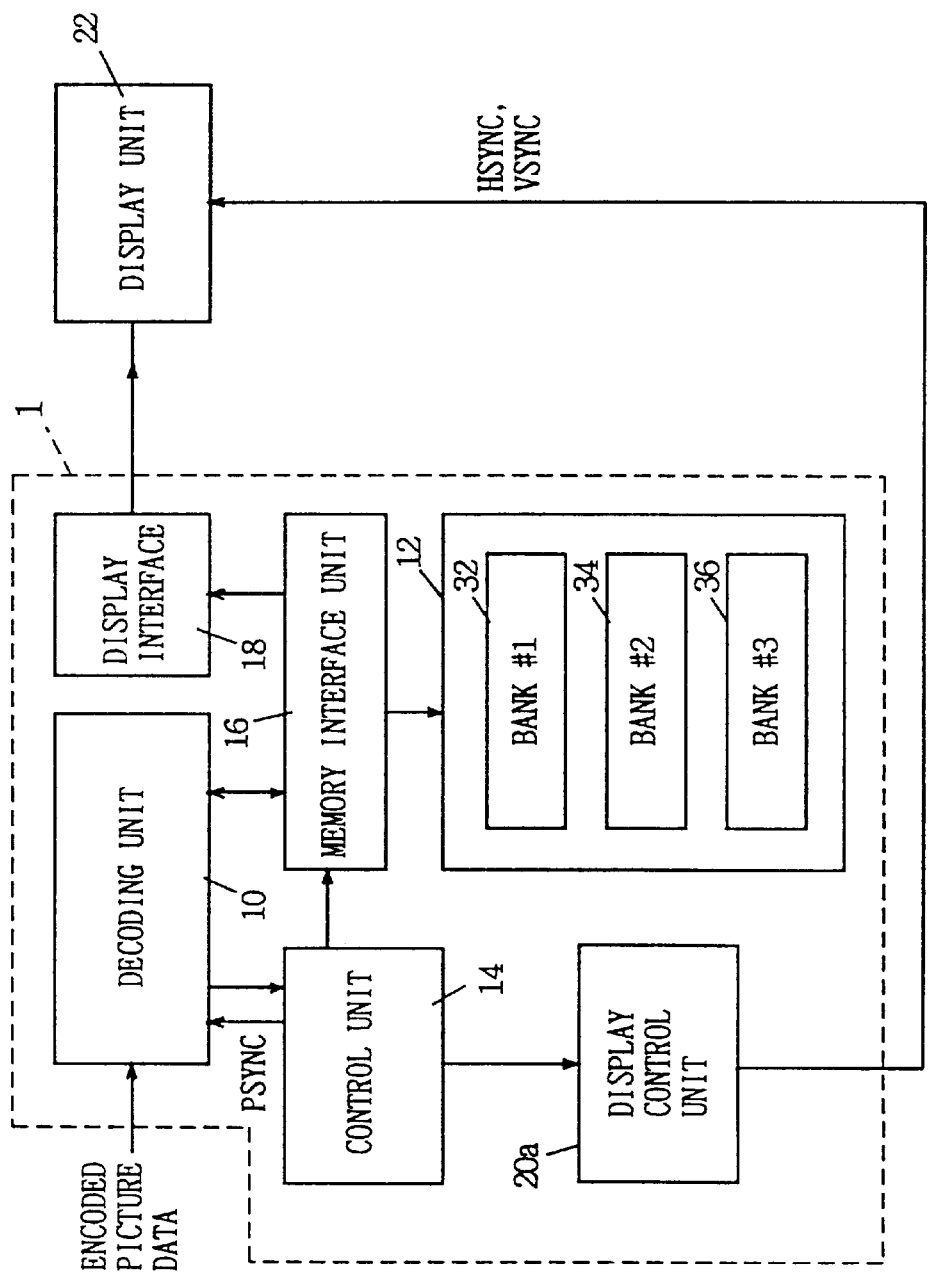
FIG. 25 schematically illustrates the overall structure of a picture decoding/display unit according to a fifth embodiment of the present invention.
Figure 26:
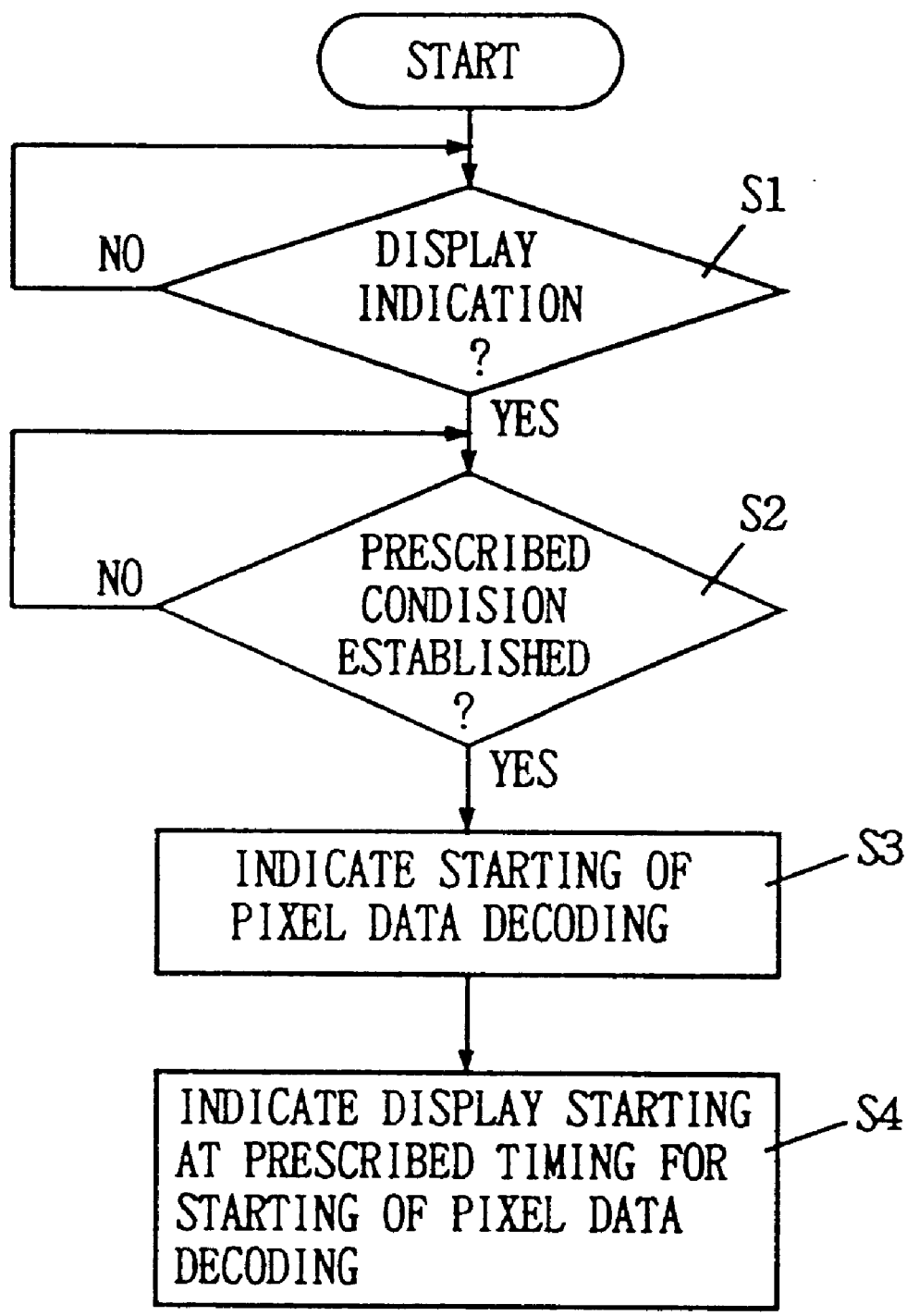
FIG. 26 is a flow chart showing an operation sequence of the picture decoding/display unit shown in FIG. 25.
Figure 27:
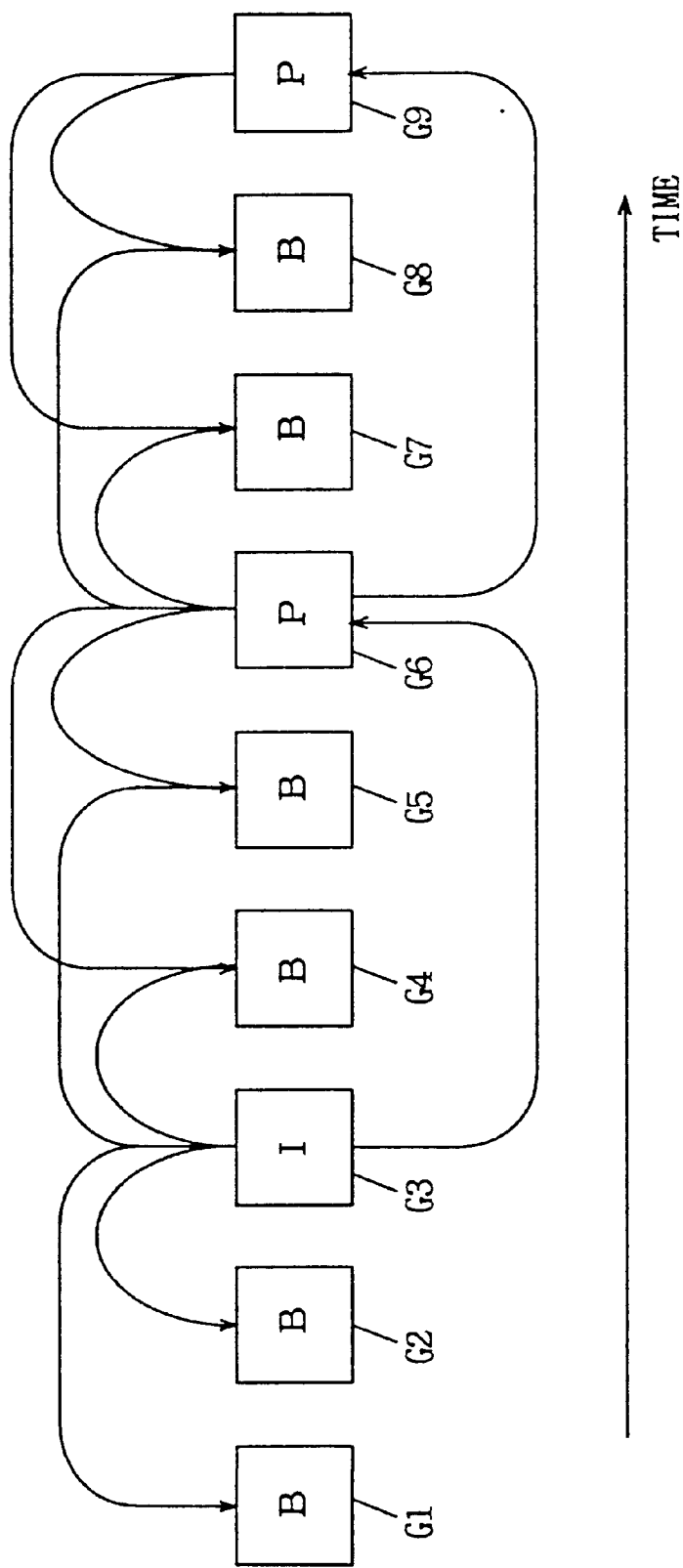
FIG. 27 illustrates a picture predictive encoding system according to the MPEG standard.
Figure 28:
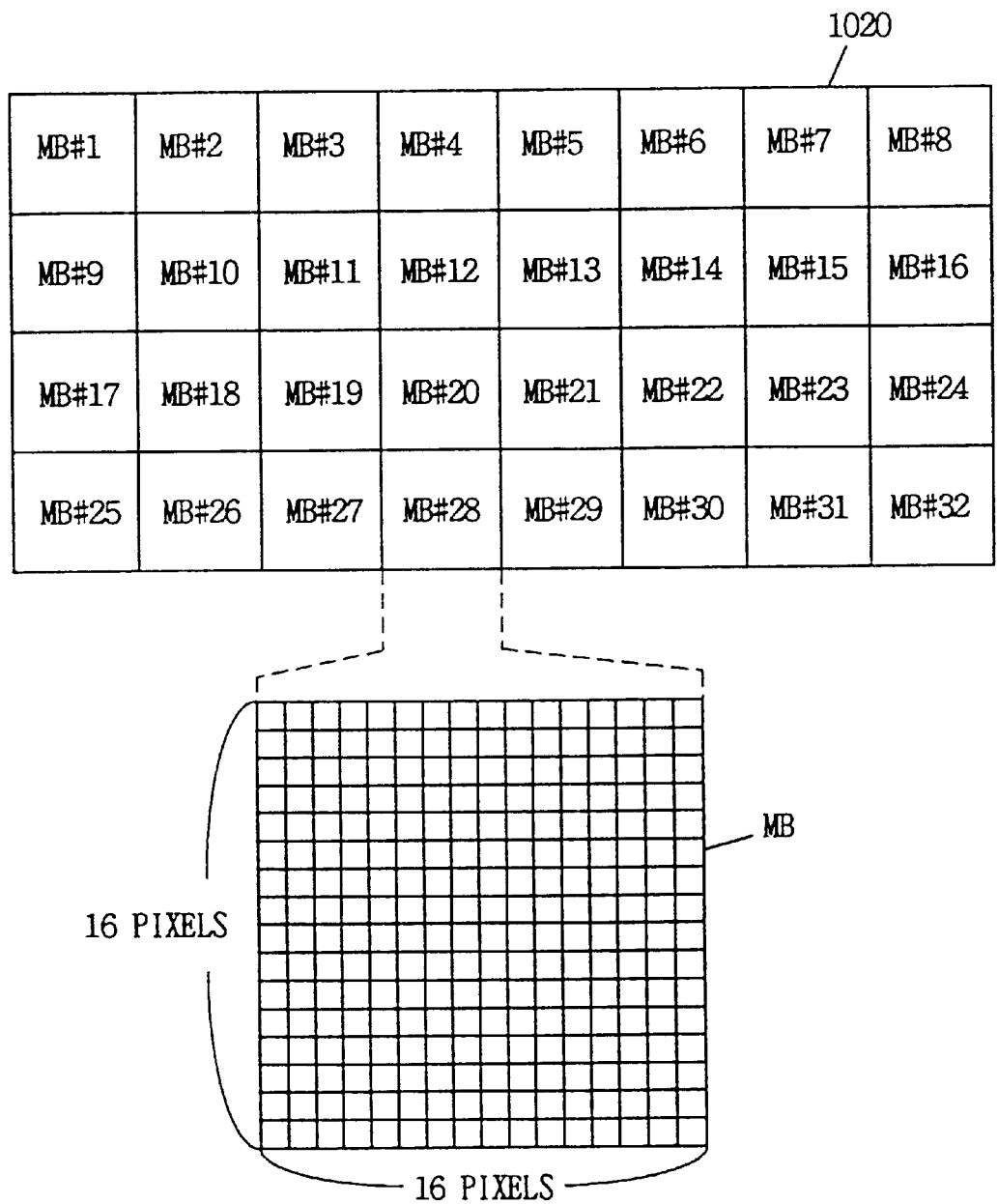
FIG. 28 schematically illustrates the structure of a picture.

FIG. 25 schematically illustrates the overall structure of a picture decoding/display unit according to a fifth embodiment of the present invention. The picture decoding/display unit shown in FIG. 25 includes a display control unit 20*a* which outputs horizontal and vertical synchronizing signals HSYNC and VSYNC at prescribed timings under control by a control unit 14. The remaining structure is identical to that shown in FIG. 1, and corresponding parts are denoted by the same reference numerals. With reference to an operation flow chart shown in FIG. 26, the operation of the picture decoding/display unit shown in FIG. 25 is now described.

First, a determination is made as to whether or not a display instruction for instructing a picture display on the display unit is externally supplied by a user's command, for example (step S1). This display instruction may be generated by application of power supply voltage for this picture decoding/display unit, for example. Where picture information of a plurality of channels is supplied, the display instruction may be desired channel selection information.

When the display instruction is supplied, the control unit 14 determines whether or not prescribed conditions are established (step S2). The prescribed conditions are those conditions that header information of a macro block included in a bit stream is entirely analyzed in a decoding unit 10 and a state where encoded pixel data is to be decoded is then reached and/or data more than a predetermined quantity are stored in a rate buffer (not shown) for storing the encoded data (including both of encoded pixel data and header information) included in the bit stream. When the prescribed conditions are established, the control unit 14 supplies a pixel data decoding start instruction to the decoding unit 10. Referring to FIG. 25, picture synchronizing signal PSYNC is supplied to the decoding unit 10. This picture synchronizing signal may be the decoding start indication signal shown in any of the aforementioned embodiments 2 to 4 (step S3).

In accordance with the pixel data decoding start instruction (assertion of the picture synchronizing signal PSYNC, for example), the control unit 14 supplies a display start indication signal for starting a display operation at the prescribed timing described with reference to each of the first to fourth embodiments to the display control unit 20*a* (step S4). When the display start instruction is supplied from the control unit 14, the display control unit 20*a* supplies the horizontal and vertical synchronizing signals HSYNC and VSYNC to the display unit 22 at prescribed timings. At this time, the control unit 14 supplies the memory interface unit 16 with a control signal for carrying out an operation of displaying restored pixel data read from a memory device 12 in response to assertion of the vertical synchronizing signal VSYNC. Thereafter the display control unit 20*a* asserts the horizontal and vertical synchronizing signals HSYNC and VSYNC at the initially set timings. The memory interface unit 16 and display interface 18 read restored pixel data from the memory device 12 and supply the read pixel data to the display unit at timings similar to those described with reference to the first to fourth embodiments, under control by the control unit 14. Thus, the display unit 22 successively displays the restored pixel data in synchronization with the horizontal synchronizing signal HSYNC.

In the structure of the picture decoding/display unit shown in FIG. 25, the timing relation between the picture synchronizing signal (or the decoding start indication signal) and the horizontal and vertical synchronizing signals HSYNC and VSYNC for display is set in an initialization sequence in which the picture display instruction is applied. Thereafter decoding of encoded pixel data and display of restored pixel data are carried out while maintaining this timing relation.

Also when the timing for starting the display operation is set with reference to decoding start instruction, it is possible to attain an effect similar to those of the first to fourth embodiments, as shown in the fifth embodiment.

According to the present invention, as hereinabove described, it is possible to obtain a picture decoding/display unit which can correctly carry out decoding and display while preventing substitution of picture data even when the storage capacity of a memory for storing the picture data is reduced.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A picture decoding and display unit for decoding predictively encoded pixel data of a picture included in a supplied bit stream, restoring original pixel data for outputting to a display unit for display thereon, said picture being formed by pixel data of a frame having two fields, said picture decoding and display unit comprising:

decoding means coupled to receive said bit stream, for extracting said pixel data included in said bit stream and carrying out a decoding processing on the extracted pixel data to restore said original pixel data, said decoding means including means for extracting information indicating whether a type of said frame of the supplied pixel data included in said bit stream is an I/P picture employed as a reference picture in the decoding processing of a B picture not employed as the reference picture but subjected to only display, for identifying the type of said frame;

memory means coupled to said decoding means for storing the pixel data of said B picture restored by said decoding means in accordance with a B picture identification indication signal from said decoding means;

read means coupled to said memory means for reading the pixel data stored in said memory means and outputting the read out pixel data to said display unit for display; and control means coupled to said decoding means and said read means for controlling operation timings of said decoding means and said read means such that time difference between a timing for starting said decoding processing of a B picture and that for outputting the restored pixel data of said B picture from said memory means to said display unit through said read means is substantially one field time required for outputting one field pixel data of said B picture to said display unit, said control means including means for starting a decoding operation of a first field of a subsequent frame in response to starting of reading of pixel data of the last field of a decoded and stored frame to the display unit.

2. The picture decoding and display unit in accordance with claim 1, wherein said decoding processing is carried out in units of blocks of the pixel data of prescribed sizes on a screen, said picture including M said blocks in a horizontal direction on said screen, and said control means includes delay means for equivalently delaying said timing for starting said decoding processing of said decoding means by a time required for reading said pixel data of said M blocks from said memory means.

3. The picture decoding and display unit in accordance with claim 2, wherein said delay means includes buffer memory means arranged between a pixel data output part of said memory means and an output port of said read means being coupled to said display unit, for storing supplied said pixel data for a prescribed time.

4. The picture decoding and display unit in accordance with claim 2, wherein said bit stream includes data structure information indicating whether said pixel data of said picture are supplied in a unit of a field or in a unit of a frame including said pixel data of said two fields in a mixed state, and said decoding means includes extraction means for extracting said data structure information from said bit stream and designating a data structure indicated by said data structure information, said control means including means for inactivating said delay means in response to indication of said units of said fields by said data structure information supplied from said extraction means.

5. The picture decoding and displaying unit in accordance with claim 2, wherein said control means delays the start timing of decoding the pixel data of a B picture immediately following another B picture.

6. The picture decoding and display unit in accordance with claim 1, wherein said pixel data are supplied in units of said fields.

7. The picture decoding and display unit in accordance with claim 1, wherein said memory means is formed by a frame memory storing one frame of pixel data.

8. The picture decoding and display unit for decoding predictively encoded pixel data of a picture included in an incoming bit stream, restoring original pixel data and outputting the restored original pixel data for display on a display unit, said picture formed by a frame of a plurality of fields, said picture decoding and display unit comprising:

decoding means coupled to receive said bit stream, for carrying out a decoding processing on said predictively encoded pixel data to restore said original pixel data;

storage means coupled to said decoding means, for storing said restored pixel data received from said decoding means;

read means coupled to said storage means, for reading pixel data from said storage means for outputting said display unit for display thereon;

control means coupled to said read means and said decoding means for making said decoding means start decoding processing of pixel data of a frame supplied subsequently to a certain frame including a last field to be finally displayed in the certain frame in response to reading of said last field from said read means, said picture being different from a picture comprised of said certain frame;

wherein types of said frame of said picture include an I/P picture employed as a reference picture in the decoding processing and a B picture not employed as the reference picture but subjected to only display, said storage means includes a frame memory storing pixel data of one frame as a storage element for storing only said B picture pixel data.

9. A picture decoding and display unit for decoding predictively encoded pixel data of a picture included in a supplied bit stream, restoring original pixel data for outputting to a display unit for display thereon, said picture formed by a frame of two fields, said picture decoding and display unit comprising:

decoding means coupled to receive the bit stream, for carrying out a decoding processing on said predictively encoded pixel data in the received bit stream to restore said original pixel data;

storage means coupled to said decoding means, for storing the restored pixel data received from said decoding means;

read means coupled to said storage means, for reading said pixel data from said storage means for outputting to said display unit for display thereon; and control means coupled to said read means and said decoding means for starting reading of pixel data of a first field of a frame to be displayed with a time difference required for reading pixel data of one field from said storage means in response to starting of the decoding processing on the first field in said decoding means;

said control means includes means for starting a decoding operation of a first field of a subsequent frame in response to starting of reading of pixel data of a last field of the decoded and stored frame to the display unit.

10. The picture decoding and display unit in accordance with claim 9, wherein said decoding processing is carried out in units of blocks of pixel data of prescribed sizes on a screen, said picture including M said prescribed sizes of blocks in a horizontal direction on said screen, and said control means further includes delay means for equivalently delaying a timing for starting said decoding processing on a frame subsequent to the frame including said first field of said decoding means by a time required for reading said pixel data of said M blocks from said storage means, with respect to the starting of the reading of said storage means.

11. The picture decoding and display unit in accordance with claim 10, wherein said delay means includes buffer storage means arranged between a pixel data output part of said storage means and an output port of said read means coupled to said display unit, for storing the pixel data received from said storage means for a prescribed time.

12. The picture decoding and display unit in accordance with claim 9, wherein types for said frames of said pictures include an I/P picture employed as a reference picture in the decoding processing and a B picture not employed as the reference picture but subjected to only display, said storage means includes a frame memory storing pixel data of one frame as a storage element for storing only pixel data of said B picture.

* * * * *